US012614089B2

(12) United States Patent　　　　(10) Patent No.:　US 12,614,089 B2
Lin　　　　　　　　　　　　　　　　(45) Date of Patent:　　Apr. 28, 2026

(54) GAME SERVICE EXECUTION METHOD AND APPARATUS BASED ON ARTIFICIAL INTELLIGENCE, DEVICE, AND MEDIUM

(71) Applicant: Tencent Technology (Shenzhen) Company Limited, Shenzhen (CN)

(72) Inventor: Jieqiong Lin, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 1175 days.

(21) Appl. No.: 17/506,460

(22) Filed: Oct. 20, 2021

(65) Prior Publication Data

US 2022/0044138 A1　　Feb. 10, 2022

Related U.S. Application Data

(63) Continuation of application No. PCT/CN2020/115866, filed on Sep. 17, 2020.

(30) Foreign Application Priority Data

Nov. 12, 2019　(CN) .......................... 201911101292.7

(51) Int. Cl.
　*G06N 7/08*　　　(2006.01)
　*G06N 5/04*　　　(2023.01)
　*G06N 20/00*　　(2019.01)
(52) U.S. Cl.
　CPC .............. *G06N 5/04* (2013.01); *G06N 20/00* (2019.01)
(58) Field of Classification Search
　None
　See application file for complete search history.

(56) References Cited

U.S. PATENT DOCUMENTS

2015/0018060 A1　1/2015　Naveh et al.
2020/0090072 A1*　3/2020　Troyer ................... G06N 10/60
　　　　　　　　　　　(Continued)

FOREIGN PATENT DOCUMENTS

CN　　106469317 A　　3/2017
CN　　107292389 A　　10/2017
　　　　　(Continued)

OTHER PUBLICATIONS

Tencent Technology, WO, PCT/CN2020/115866, Dec. 21, 2020, 5 pgs.
　　　　　(Continued)

*Primary Examiner* — Sunit Pandya
(74) *Attorney, Agent, or Firm* — Morgan, Lewis & Bockius LLP

(57)　　　　　ABSTRACT

This application discloses a game service execution method performed at a computer device for a game service. The method includes: constructing, in an $i^{th}$ round of game in the game service including a static game, a Monte-Carlo tree corresponding to the $i^{th}$ round of game, where the Monte-Carlo tree includes: an initial node, at least two participant nodes, at least two logic distribution nodes, and at least two logic gate nodes that correspond to the static game; simulating a game result on each path in the Monte-Carlo tree; backpropagating benefits of the game results corresponding to multiple paths in the Monte-Carlo tree to a highest-layer AI participant node of the AI participant in the Monte-Carlo tree; and selecting an execution action of the highest-layer AI participant node on a path that has the highest benefit, and outputting the execution action as an AI execution action of the AI participant.

15 Claims, 12 Drawing Sheets

(56)                    References Cited

U.S. PATENT DOCUMENTS

2020/0234164 A1*   7/2020   Li  ...................... G06Q 30/0631
2020/0364597 A1*   11/2020   Friedlander ........... G06N 20/10
2022/0379224 A1*   12/2022   Zhang ................... G06Q 50/10

FOREIGN PATENT DOCUMENTS

CN          108985458 A     12/2018
CN          109002893 A     12/2018
CN          109800294 A      5/2019
CN          110826717 A      2/2020

OTHER PUBLICATIONS

Tencent Technology, IPRP, PCT/CN2020/115866, May 17, 2022, 6 pgs.
Tencent Technology, ISR, PCT/CN2020/115866, Dec. 21, 2020, 2 pgs.

* cited by examiner

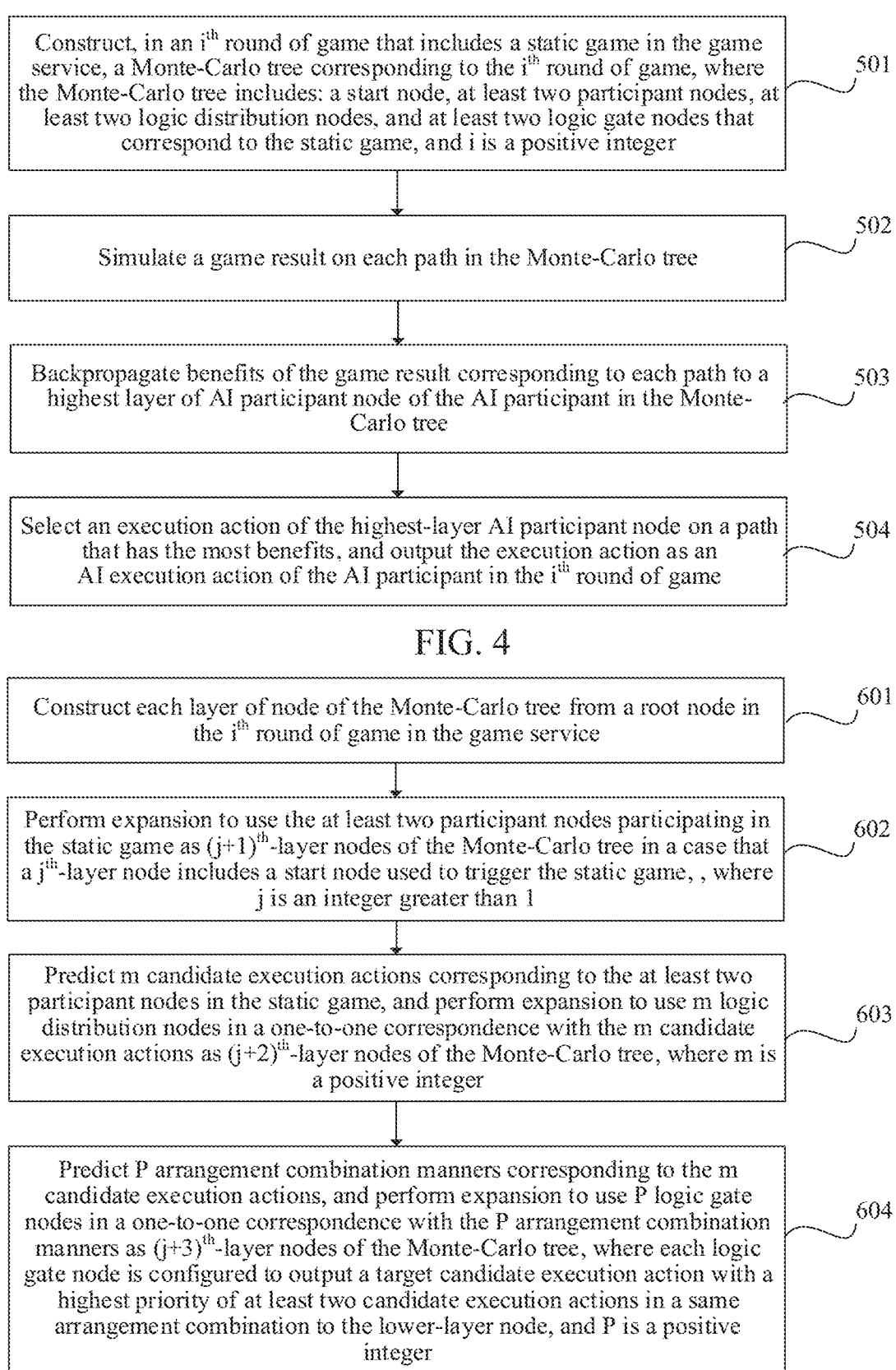

Construct, in an ith round of game that includes a static game in the game service, a Monte-Carlo tree corresponding to the ith round of game, where the Monte-Carlo tree includes: a start node, at least two participant nodes, at least two logic distribution nodes, and at least two logic gate nodes that correspond to the static game, and i is a positive integer ⟍501

Simulate a game result on each path in the Monte-Carlo tree ⟍502

Backpropagate benefits of the game result corresponding to each path to a highest layer of AI participant node of the AI participant in the Monte-Carlo tree ⟍503

Select an execution action of the highest-layer AI participant node on a path that has the most benefits, and output the execution action as an AI execution action of the AI participant in the ith round of game ⟍504

FIG. 4

Construct each layer of node of the Monte-Carlo tree from a root node in the ith round of game in the game service ⟍601

Perform expansion to use the at least two participant nodes participating in the static game as (j+1)[th]-layer nodes of the Monte-Carlo tree in a case that a jth-layer node includes a start node used to trigger the static game, , where j is an integer greater than 1 ⟍602

Predict m candidate execution actions corresponding to the at least two participant nodes in the static game, and perform expansion to use m logic distribution nodes in a one-to-one correspondence with the m candidate execution actions as (j+2)[th]-layer nodes of the Monte-Carlo tree, where m is a positive integer ⟍603

Predict P arrangement combination manners corresponding to the m candidate execution actions, and perform expansion to use P logic gate nodes in a one-to-one correspondence with the P arrangement combination manners as (j+3)[th]-layer nodes of the Monte-Carlo tree, where each logic gate node is configured to output a target candidate execution action with a highest priority of at least two candidate execution actions in a same arrangement combination to the lower-layer node, and P is a positive integer ⟍604

FIG. 5

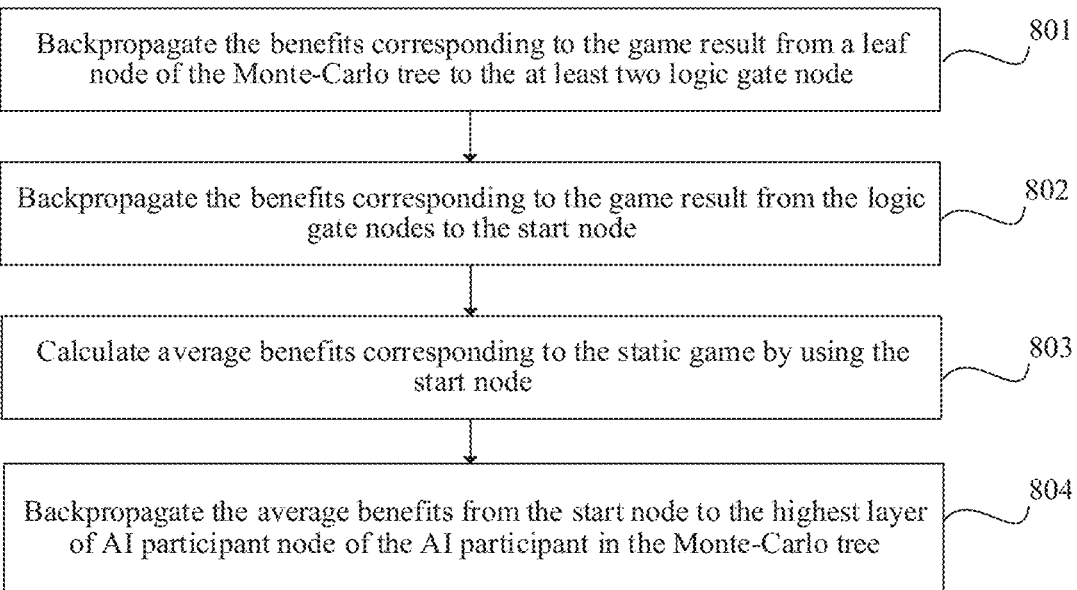

Backpropagate the benefits corresponding to the game result from a leaf node of the Monte-Carlo tree to the at least two logic gate node    801

Backpropagate the benefits corresponding to the game result from the logic gate nodes to the start node    802

Calculate average benefits corresponding to the static game by using the start node    803

Backpropagate the average benefits from the start node to the highest layer of AI participant node of the AI participant in the Monte-Carlo tree    804

FIG. 7

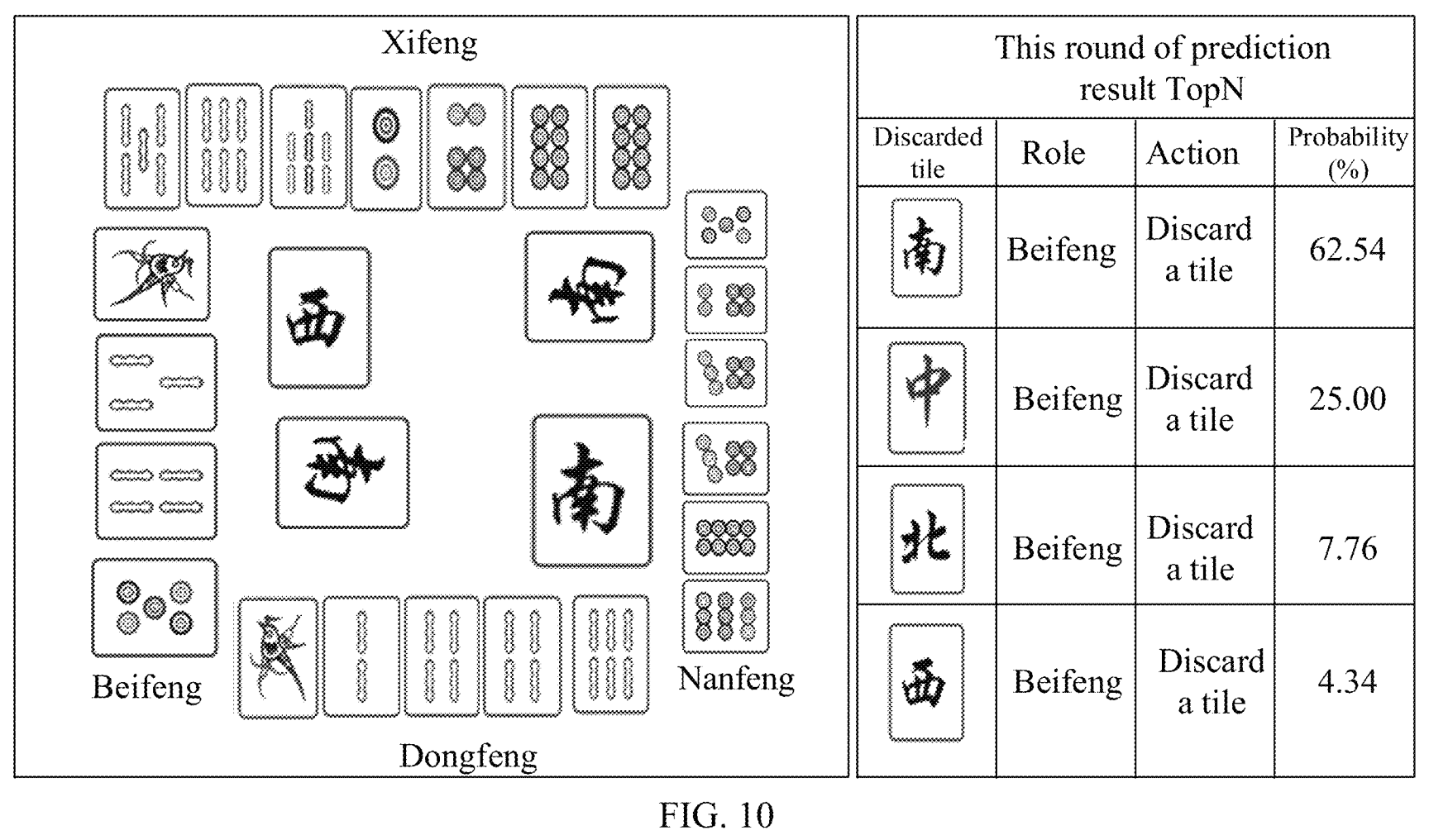

| This round of prediction result TopN | | | |
|---|---|---|---|
| Discarded tile | Role | Action | Probability (%) |
| | Beifeng | Discard a tile | 62.54 |
| | Beifeng | Discard a tile | 25.00 |
| | Beifeng | Discard a tile | 7.76 |
| | Beifeng | Discard a tile | 4.34 |

FIG. 10

GAME SERVICE EXECUTION METHOD AND APPARATUS BASED ON ARTIFICIAL INTELLIGENCE, DEVICE, AND MEDIUM

CROSS-REFERENCE TO RELATED APPLICATIONS

This application is a continuation application of PCT Patent Application No. PCT/CN2020/115866, entitled "ARTIFICIAL INTELLIGENCE-BASED GAME SERVICE EXECUTION METHOD AND APPARATUS, DEVICE AND MEDIUM" filed on Sep. 17, 2020, which claims priority to Chinese Patent Application No. 201911101292.7, filed with the State Intellectual Property Office of the People's Republic of China on Nov. 12, 2019, and entitled "GAME SERVICE EXECUTION METHOD AND APPARATUS BASED ON ARTIFICIAL INTELLIGENCE, DEVICE, AND MEDIUM", all of which are incorporated herein by reference in their entirety.

FIELD OF THE TECHNOLOGY

This application relates to the field of game theory, and in particular, to a game service execution method and apparatus based on artificial intelligence, a device, and a medium.

BACKGROUND OF THE DISCLOSURE

Games are behaviors of a competitive or confrontational nature. All participants in a game select an action plan while abiding by a rule to maximize respective interests.

A Monte-Carlo tree search (MCTS) algorithm can solve a problem of a dynamic game. For example, AlphaGo constructed based on the MCTS algorithm can compete with professional human Go players in Go competitions. AlphaGo searches for an optimal solution applicable to a current game to determine a position for laying a stone. Due to characteristics of a dynamic game, AlphaGo can continuously expand child nodes based on a position for laying a stone of a competitor, and select a position for laying a stone corresponding to an optimal result, so that a winning rate of AlphaGo gradually increases.

However, the MCTS algorithm cannot solve a problem of a static game. For example, in a static game of a Mahjong service, information obtained by all participants is incomplete, and a participant can only obtain information about tiles of the participant, and cannot obtain information about tiles of the other three participants and remaining tiles. In addition, rules of "chow", "pung", and "kong" randomly disrupt orders of discarding and taking tiles by a participant. As a result, a Monte-Carlo tree constructed based on the MCTS algorithm is irregular and changes dynamically with a situation. Consequently, in the MCTS algorithm, normal search cannot be performed.

SUMMARY

Embodiments of the application provide a game service execution method and apparatus based on artificial intelligence, a device, and a medium. A logic distribution node and a logic gate node are disposed in a Monte-Carlo tree structure, so that normal search can be performed in the Monte-Carlo tree when a static game service is executed. The technical solutions are as follows.

According to one aspect of this application, a game service execution method based on artificial intelligence is performed at a computer device for a game service. The game service is a computer service in which n participants perform a game according to a game rule, $n \geq 2$ and n is an integer, the n participants include an artificial intelligence AI participant, and the method including:

constructing, in an $i^{th}$ round of game in the game service including a static game, a Monte-Carlo tree corresponding to the $i^{th}$ round of game, where the Monte-Carlo tree includes: an initial node, at least two participant nodes, at least two logic distribution nodes, and at least two logic gate nodes that correspond to the static game, the logic distribution node is configured to forward, according to an arrangement combination, candidate execution actions corresponding to the at least two participant nodes in the static game to different logic gate nodes, each logic gate node is configured to output a target candidate execution action with a highest priority of at least two candidate execution actions in a same arrangement combination to a lower-layer node according to the game rule, and i is a positive integer;

simulating a game result on each path in the Monte-Carlo tree, the game result including a benefit corresponding to the path in the Monte-Carlo tree;

backpropagating benefits of the game result corresponding to multiple paths in the Monte-Carlo tree to a highest-layer AI participant node of the AI participant in the Monte-Carlo tree; and selecting an execution action of the highest-layer AI participant node on a path that has the highest benefit, and outputting the execution action as an AI execution action of the AI participant in the $i^{th}$ round of game.

According to another aspect of this application, a computer device is provided. The computer device includes a processor and a memory, the memory stores at least one computer program for a game service in which n participants perform a game according to a game rule, $n \geq 2$ and n being an integer, the n participants comprising an artificial intelligence AI participant, the at least one computer program being loaded and executed by the processor to perform the game service execution method based on artificial intelligence according to the foregoing aspect.

According to another aspect of this application, a non-transitory computer-readable storage medium is provided. The non-transitory computer-readable storage medium stores at least one computer program for a game service in which n participants perform a game according to a game rule, $n \geq 2$ and n being an integer, the n participants comprising an artificial intelligence AI participant, the at least one computer program being loaded and executed by a processor of a computer device to perform the game service execution method based on artificial intelligence according to the foregoing aspect.

The technical solutions provided in the embodiments of this application achieve at least the following beneficial effects:

In the $i^{th}$ round of game in the game service including the static game, the initial node, the at least two logic distribution nodes, and the at least two logic gate nodes that correspond to the static game are disposed in the Monte-Carlo tree constructed in correspondence with the $i^{th}$ round of game. In this way, during the static game, the execution action of the participant may be transferred to the lower-layer node unidirectionally, and benefits of the game result may be backpropagated to an upper-layer node unidirectionally. Therefore, information does not flow bidirectionally, and the MCTS algorithm can be applied to the game service including the static game.

BRIEF DESCRIPTION OF THE DRAWINGS

To describe the technical solutions in embodiments of this application more clearly, the accompanying drawings required for describing the embodiments are briefly described below. Apparently, the accompanying drawings in the following description show merely some embodiments of this application, and a person of ordinary skill in the art may still derive other accompanying drawings according to the accompanying drawings without creative efforts.

FIG. 4 is a flowchart of a game service execution method based on artificial intelligence according to an exemplary embodiment of this application;

FIG. 5 is a flowchart of a method for constructing a Monte-Carlo tree in a game service based on artificial intelligence according to an exemplary embodiment of this application;

FIG. 7 is a flowchart of a method for backpropagating benefits of a game result in a game service based on artificial intelligence according to an exemplary embodiment of this application;

FIG. 10 is a schematic diagram of an interface for executing a Mahjong service based on artificial intelligence according to an exemplary embodiment of this application;

DESCRIPTION OF EMBODIMENTS

Figure 1:
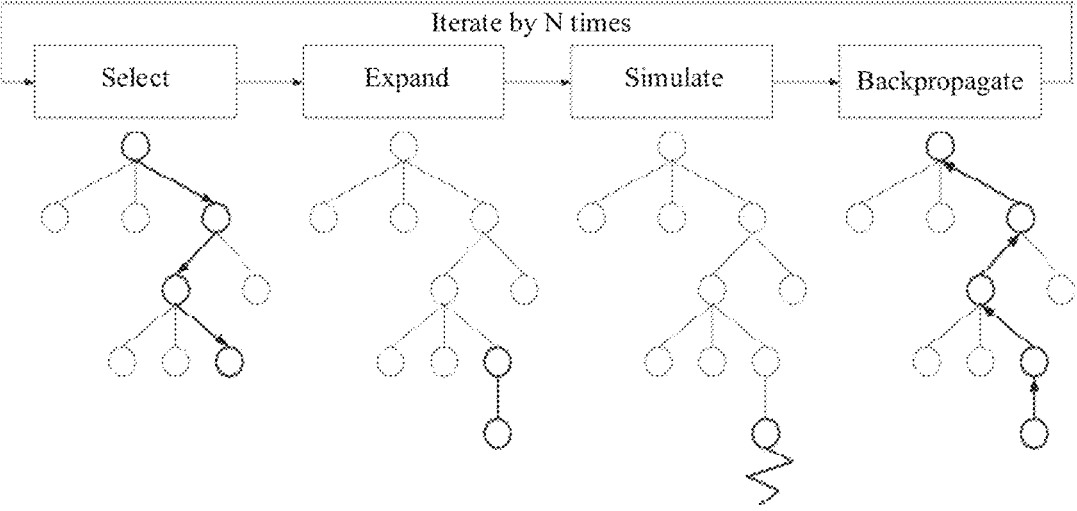
FIG. 1 is a schematic diagram of a running process of an MCTS algorithm according to an exemplary embodiment of this application.

To make objectives, technical solutions, and advantages of this application clearer, the following further describes implementations of this application in detail with reference to the accompanying drawings.

First, terms involved in the embodiments of this application are introduced as follows:

Game theory: At least two users perform a behavior of a competitive or confrontational nature. Participants have different goals or interests. To achieve respective goals and interests, participants need to consider various possible action plans of competitors and select the most beneficial plans. For example, playing chess and playing cards are both game behaviors.

Dynamic game: A dynamic game is also referred to as a sequential game and means that actions of all participants of a game are sequential, and a later player can observe an action selected by a former player and select a corresponding action according to the action of the former player. For example, a user A and a user B play Go, and the user A is a former player and the user B is a later player. The user A and the user B lay stones in turns, and the user B determines, based on a position for laying a stone of the user A, a position for laying a stone.

Static game: All participants of a game simultaneously or non-simultaneously select actions. When participants non-simultaneously select actions, a later player is not clear about a specific action taken by a former player. For example, the user A and the user B play a roshambo game (rock, paper, and scissors). The user A and the user B stretch out hands simultaneously. Before stretching out hands, the user A and the user B cannot know specific gestures of each other (that is, the user A cannot know whether a gesture of the other participant is rock, scissors, or paper).

Complete information game: During a game, each participant has accurate information about, for example, characteristics, room for maneuver, and benefit functions of other participants.

Incomplete information game: During a game, a participant does not have accurate information about, for example, characteristics, room for maneuver, and benefit functions of other participants, or a participant has no information about, for example, characteristics, room for maneuver, and benefit functions of all other participants. For example, the game service is Mahjong. All four participants participating in Mahjong clearly know tile information of themselves, but cannot know tile information of other participants and tile information of a remaining tile.

Game service: At least two participants select a behavior or a policy in a same event based on information known in the event, make a decision according to an order stipulated in the event, and obtain corresponding benefits after selecting decisions. The event ends when a winner appears in the participants. For example, the game service is playing chess, playing poker, playing Mahjong, playing bridge, roshambo, or auction.

Logic gate node: A logic gate node is a logic calculation unit constructed in a server to select a game decision. A logic gate is usually configured to perform logical operations such as "or", "and", "NOR", and "AND". In the embodiments of this application, a logic gate node is configured to compare a plurality of decision-making actions and select a decision that abides by a game service rule and has a highest priority. When a winning or losing outcome corresponding to execution information is returned to a root node based on a backpropagation algorithm, the logic gate node guarantees that the information can flow to a relevant node unidirectionally.

Logic distribution node: A logic distribution node is a logic calculation unit constructed in a server to distribute a candidate execution action of a participant node. In the embodiments of this application, the logic distribution node is configured to forward candidate execution actions corresponding to at least two participant nodes in a static game to different logic gate nodes according to an arrangement combination. The logic distribution node is configured to transfer an execution action of a participant and benefits of a game result corresponding to the execution action.

Action distribution node: An action distribution node is a logic calculation unit constructed in a server to forward an execution action to other participant nodes participating in a game service. In the embodiments of this application, when an execution action of a participant triggers a static game, the action distribution node is configured to forward a corresponding execution action in the static game to a participant node corresponding to a remaining participant. After each path is simulated, benefits of a game result corresponding to an execution action on the path needs to be backpropagated to a root node. The action distribution node can record an execution action on each path and benefits of a corresponding game result.

Artificial Intelligence (AI) is a theory, a method, a technology, and an application system that use a digital computer or a machine controlled by the digital computer to simulate, extend, and expand human intelligence, perceive an environment, obtain knowledge, and use knowledge to obtain an optimal result. That is, artificial intelligence is a comprehensive technology of computer science and attempts to understand the essence of intelligence and produce a new intelligent machine that can react in a way similar to human intelligence. The AI is to study design principles and implementation methods of various intelligent machines, to enable the machines to have functions of perception, reasoning, and decision-making.

Basic AI technologies generally include technologies such as a sensor, a dedicated AI chip, cloud computing, distributed storage, a big data processing technology, an operating/interaction system, and electromechanical integration. AI software technologies mainly include several major directions such as a computer vision (CV) technology, a speech processing technology, a natural language processing technology, and machine learning (ML)/deep learning (DL). For example, AlphaGo is a Go artificial intelligence program, and uses a neural network, deep learning, a Monte-Carlo tree search method, and the like, to compete with a professional human Go player.

With research and progress of artificial intelligence technologies, artificial intelligence technologies are researched and applied in many fields, for example, common smart home, smart wearable devices, virtual assistants, smart speakers, smart marketing, self-driving, autonomous driving, drones, robots, smart medical care, smart customer service, games, sealed-bid auctions, and the like. With development of technologies, it is believed that artificial intelligence technologies are to be applied in more fields and play more important roles.

The solution provided in the embodiments of this application relates to a technology of applying artificial intelligence to a game service. This is specifically described in the following embodiments.

The following describes a Monte-Carlo tree search (MCTS) algorithm, as shown in FIG. 1.

In the MCTS algorithm, nodes in a Monte-Carlo tree are expanded according to a current game situation, until a game ends. The Monte-Carlo tree is constructed from a root node. The MCTS algorithm includes the following four processes:

1. Selection: Select any child node starting from a root node in a Monte-Carlo tree to start running, until a terminating node on a path of the child node is reached. An optimal child node is usually selected to start running when the MCTS algorithm runs. The optimal child node means that an execution action corresponding to the child node has a higher probability of winning a game result.

2. Expansion: Expand a plurality of child nodes downwards from the root node in the Monte-Carlo tree. When a child node is a terminating node (the terminating node is a node that terminates a game), the game tree stops expanding downwards on a path from the terminating node to the root node. When the child node is not a terminating node, the path of the child node continues to expand downwards.

3. Simulation: Simulate a path from a child node to a terminating node and output a game result of an execution action corresponding to the path or benefits of the game result.

4. Backpropagation: Backpropagate the game result of the execution action corresponding to the path or the benefits of the game result to a root node, so that the root node updates a current action sequence according to the game result.

The embodiments of this application provide a game service execution method based on artificial intelligence. During constructing of the Monte-Carlo tree, the action distribution node, the logic distribution node, and the logic gate node are disposed. In this way, when the game service includes the static game, information may be transferred downwards unidirectionally, and the game result may be backpropagated upwards unidirectionally. Therefore, information does not flow bidirectionally, and the MCTS algorithm can be applied to the game service including the static game.

Figure 2:
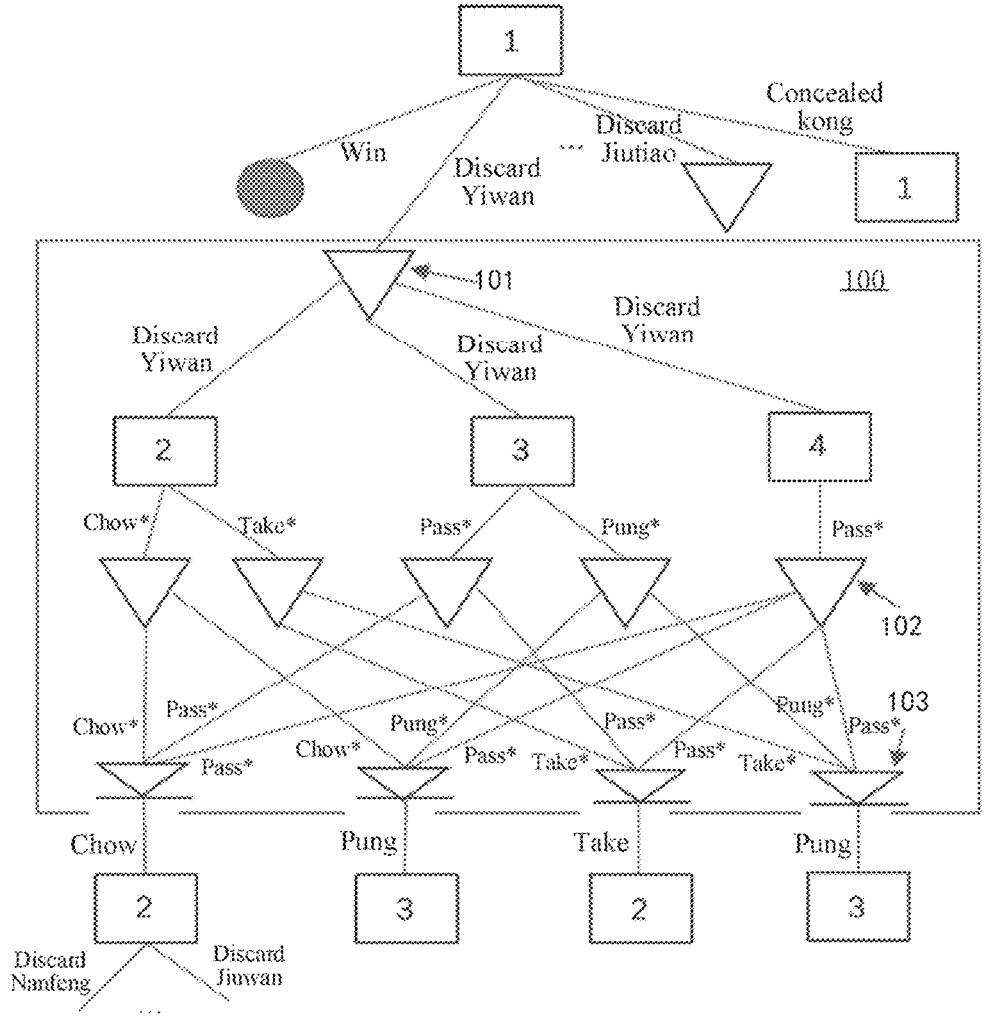
FIG. 2 is a schematic structural diagram of a Monte-Carlo tree of a game service based on artificial intelligence according to an exemplary embodiment of this application.

For example, the game service is a Mahjong service. FIG. 2 is a schematic architectural diagram of a game service including a static game according to an exemplary embodiment of this application.

In an $i^{th}$ (i is a positive integer) round of game in the Mahjong service including a static game, a Monte-Carlo tree corresponding to the $i^{th}$ round of game is constructed. A block 100 in the figure indicates a structure of the Monte-Carlo tree in the $i^{th}$ round of game of the Mahjong service. The Monte-Carlo tree includes: an action distribution node 101, a participant node 1, a participant node 2, a participant node 3, a participant node 4, a logic distribution node 102, and a logic gate node 103. The logic distribution node 102 is configured to forward, according to an arrangement combination, candidate execution actions corresponding to at least two participant nodes in the static game to different logic gate nodes 103. Each logic gate node 103 is configured to output a target candidate execution action with a highest priority of at least two candidate execution actions in a same arrangement combination to a lower-layer node according to the game rule.

In the Mahjong service, "chow" means that a participant may combine tiles of the participant and a discarded tile into three sequential tiles. The discarded tile is discarded by a previous participant of the participant, and the previous participant and the participant who "chows a tile" sequentially take tiles. For example, a user 1, a user 2, a user 3, and a user 4 are located in four directions of north, west, east, and south respectively. For example, a user takes a tile in the counterclockwise order. The user 2 can only "chow" a tile discarded by the user 1, and the user 3 can only "chow" a tile discarded by the user 2. For example, if the user 2 has tiles with tile information of "Erwan" and "Sanwan", the user 2 can "chow" a tile with tile information of "Yiwan" or "Siwan" discarded by the user 1. A "pung" means that two identical tiles of a participant are combined with a discarded tile to form three identical tiles. According to different playing methods, rules of "pung" are different. For example, the user 2, the user 3, and the user 4 may all call "pung" with a tile discarded by the user 1. A "kong" means that three identical tiles of a participant are combined with a discarded tile to form four identical tiles.

A straight line with an action represents an execution action determined by a participant, and it is impossible that the execution action cannot be executed due to an insufficient priority. An execution action with an asterisk on a straight line represents an execution action that may be selected by a participant, but during execution, it is possible that the action cannot be executed due to an insufficient priority. A black node represents that there is already a winner and this round of Mahjong service ends.

For example, a participant node 1 discards a tile with tile information "Yiwan" to trigger a static game process. A participant node 2, a participant node 3, and a participant node 4 make a decision based on "Yiwan" discarded by the participant node 1. The participant node 2 may select to "chow Yiwan", that is, possess the tile "Yiwan", or may select "not to chow Yiwan" and take a tile. The participant node 3 and the participant node 4 also select respective execution actions. The logic distribution node 102 performs arrangement combination on execution actions of the participant node 2 and then forwards the execution actions to the logic gate node 103. The logic gate node 103 outputs a target candidate execution action with a highest priority of at least two candidate execution actions in a same arrangement combination to a lower-layer node according to a game rule. For example, when the participant node 2 selects an execution action corresponding to "chow" and the participant node 3 and the participant node 4 both select an execution action corresponding to "pass", "chow" has the highest priority. In this case, the logic gate node 103 selects the execution action corresponding to "chow" of the participant node 2, and transfers the action to the participant node 2. According to the game rule, the participant node 2 needs to discard a tile after "chowing a tile". By analogy, the Monte-Carlo tree constantly expands downwards until a participant node wins and the game ends.

A game result on each path in the Monte-Carlo tree is simulated. Benefits corresponding to the game result are backpropagated to a highest-layer AI participant node of the AI participant in the Monte-Carlo tree.

Illustratively, the logic gate node 103 backpropagates the execution action and the benefits corresponding to the game result to the logic distribution node 102 corresponding to the logic gate node 103. The logic distribution node 102 backpropagates the execution action and the benefits corresponding to the game result to the participant node 1, the participant node 2, and the participant node 3 that correspond to the logic distribution node 102. The three participant nodes backpropagate the execution action and the benefits corresponding to the game result to the action distribution node 101. The action distribution node 101 records an execution action of each participant node and benefits corresponding to a game result, and backpropagates the execution action of each participant node and the benefits corresponding to the game result to the participant node 1. The participant node 1 determines an execution action of the participant node 1 based on the execution action of each participant node and the benefits corresponding to the game result.

FIG. 2 only shows an arrangement combination of candidate execution actions executable by the participant node 2, the participant node 3, and the participant node 4, and does not show an arrangement combination of other candidate execution actions not executable by the three participant nodes.

In the method provided in this embodiment of this application, the action distribution node 101, the logic distribution node 102, and the logic gate node 103 are disposed in the Monte-Carlo tree. In this way, when the game service includes the static game, an execution action of a participant may be simultaneously transferred to a plurality of lower-layer nodes unidirectionally. During backpropagation, benefits corresponding to a game result may be transferred to a corresponding node unidirectionally.

Figure 3:
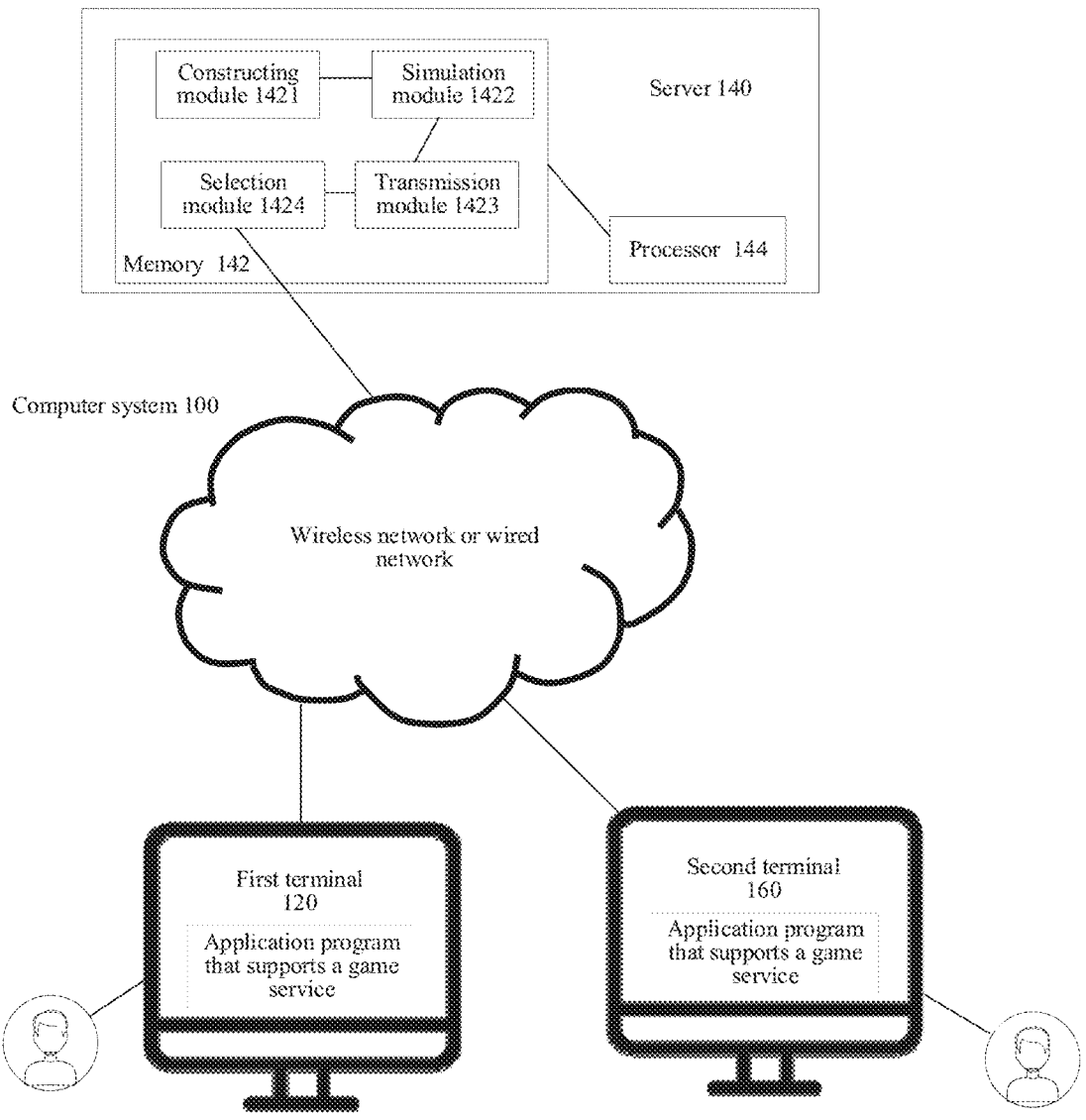
FIG. 3 is a block diagram of an implementation environment according to an exemplary embodiment of this application.

FIG. 3 is a block diagram of an implementation environment according to an exemplary embodiment of this application. The computer system 100 includes a first terminal 120, a server 140, and a second terminal 160.

An application program that supports a game service is installed and runs in the first terminal 120. The application program may include an application program corresponding to a service including a plurality of rounds of static games, or include an application program corresponding to a mixed service including a plurality of rounds of dynamic games and static games, for example, any one of an application program corresponding to a Mahjong game, an application program corresponding to a roshambo game, and an application program corresponding to auction. The first terminal 120 is a terminal used by a first user (that is, human), or a terminal corresponding to an AI participant. The first terminal 120 corresponds to the participant node provided in the embodiments of this application.

The first terminal 120 is connected to the server 140 by using a wireless network or a wired network.

The server 140 includes at least one of one server, a plurality of servers, a cloud computing platform, and a virtualization center. Illustratively, the server 140 includes a processor 144 and a memory 142. The memory 142 includes a constructing module 1421, a simulation module 1422, a transmission module 1423, and a selection module 1424. The server 140 is configured to provide a background service for an application program supporting a game service. In some embodiments, the server 140 takes on primary computing work, and the first terminal 120 and the second terminal 160 take on secondary computing work; alternatively, the server 140 takes on secondary computing work, and the first terminal 120 and the second terminal 160 take on primary computing work; alternatively, collaborative computing is performed by using a distributed computing architecture among the server 140, the first terminal 120, and the second terminal 160.

An application program that supports a game service is installed and runs in the second terminal 160. The application program may include an application program corresponding to a service including a plurality of rounds of static games, or include an application program corresponding to a mixed service including a plurality of rounds of dynamic games and static games, for example, any one of an application program corresponding to a Mahjong game, an application program corresponding to a roshambo game, and an application program corresponding to auction. The second terminal 160 is a terminal used by a second user (that is, human), or a terminal corresponding to an AI participant. Alternatively, the first terminal 120 and the second terminal 160 are both terminals corresponding to AI participants. The second terminal 160 corresponds to the participant node provided in the embodiments of this application. At least one AI participant is included in the game service. Illustratively, the second terminal 160 is a terminal corresponding to an AI participant.

The second terminal 160 is connected to the server 140 by using a wireless network or a wired network.

Illustratively, the Monte-Carlo tree constructed in the embodiments of this application may be implemented as a part of an application program and is constructed in a terminal, so that the terminal displays decision information about execution of the game service in an optimal decision for a user. Alternatively, the Monte-Carlo tree is constructed in a background server of an application program, so that the background server sends, based on the Monte-Carlo tree, decision information about execution of the game service to a terminal installed with the application program.

The memory 142 in the server 140 includes the constructing module 1421, the simulation module 1422, the transmission module 1423, and the selection module 1424. The constructing module 1421 is configured to construct the Monte-Carlo tree corresponding to the game service. The simulation module 1422 is configured to: simulate an execution action in the game and backpropagate benefits of a game result corresponding to each path to a root node in the Monte-Carlo tree by using the transmission module 1423. The selection module 1424 is configured to: select to execute an action corresponding to a game result with highest benefit, and transfer the action to the second terminal 160 through a network. The second terminal 160 executes the corresponding action, that is, the AI participant executes the corresponding action.

In some embodiments, application programs installed in the first terminal 120 and the second terminal 160 are the same, or applications installed in the two terminals are a same type of application program on different computer system platforms. The first terminal 120 may be one of a plurality of terminals in a broad sense, and the second terminal 160 may be one of a plurality of terminals in a broad sense. When performing the game service, there are at least two participant nodes, that is, at least two terminals participate in the game service. In this embodiment, for example, only the first terminal 120 and the second terminal 160 are included in the game service. Device types of the first terminal 120 and the second terminal 160 are the same or different. The device types include at least one of a smartphone, a tablet computer, a notebook computer, an e-book reader, an MP3 player, an MP4 player, a laptop portable computer, and a desktop computer. In the following embodiments, for example, the terminal includes a desktop computer.

A person skilled in the art may learn that there may be more or fewer terminals. For example, there may be merely one terminal, or there may be dozens of or hundreds of or more terminals. The quantity and the device types of the terminals are not limited in the embodiments of this application. For ease of description, for example, the game service execution method based on artificial intelligence is executed by a server in the following embodiments.

FIG. 4 is a flowchart of a game service execution method based on artificial intelligence according to an exemplary embodiment of this application. The method may be applied to the server 140 in the computer system shown in FIG. 3. The method includes the following steps:

Step 501: Construct, in an $i^{th}$ round of game in the game service including a static game, a Monte-Carlo tree corresponding to the $i^{th}$ round of game, where the Monte-Carlo tree includes: an initial node, at least two participant nodes, at least two logic distribution nodes, and at least two logic gate nodes that correspond to the static game, and i is a positive integer.

A game service is a computer service in which n participants perform a game according to a game rule, n≥2 and n is an integer, and the n participants include an AI participant. One or more AI participants participate in the game service, or n participants participating in the game service are all AI participants. In some embodiments, the game service may be a game service including a static game, or may be a mixed service including a static game and a dynamic game. Illustratively, a roshambo service includes a static game, and a Mahjong service includes a static game and a dynamic game.

When the game service is a game service including a static game, the $i^{th}$ round of game means that the $i^{th}$ round of game is triggered to start when participants simultaneously make decisions and the $i^{th}$ round of game ends only after the participants complete respective actions. Illustratively, two participants perform a roshambo service. An $i^{th}$ round of roshambo game is triggered to start when the two participants simultaneously stretch out hands, and the $i^{th}$ round of roshambo game ends when the two participants complete the action of stretching out hands. When the game service is a mixed service including a static game and a dynamic game, for example, the Mahjong service, the $i^{th}$ round of game includes a round of taking tiles by participants and a round of discarding tiles by participants. Illustratively, a user 1 discards a tile with tile information "Yiwan". According to a Mahjong rule, this action triggers the other three users to simultaneously make decisions, that is, enter the $i^{th}$ round of game. The other three users select execution actions such as "chow", "pung", "kong", "win", and "pass" ("pass" means that no execution action is executed on a currently discarded tile), but only one user can execute a selected action. For example, a user 3 executes the "pung" action on "Yiwan". In this case, a user 2 and a user 4 can no longer execute an action on "Yiwan". The user 3 discards a tile after executing the "pung" action, and the $i^{th}$ round of static game ends.

According to the foregoing process, a Monte-Carlo tree corresponding to the $i^{th}$ round of game is constructed downwards from a root node. Nodes in the Monte-Carlo tree in the $i^{th}$ round from top to bottom are sequentially: an initial node used for triggering the $i^{th}$ round of static game, at least two participant nodes, at least two logic distribution nodes, and at least two logic gate nodes. The logic distribution node is configured to forward, according to an arrangement combination, candidate execution actions corresponding to the at least two participant nodes in the static game to different logic gate nodes. Each logic gate node is configured to output a target candidate execution action with a highest priority of at least two candidate execution actions in a same arrangement combination to a lower-layer node according to the game rule. As shown in FIG. 2, the $i^{th}$ round of game service starts from the action distribution node 101, and the action distribution node 101 is the initial node of the $i^{th}$ round of static game. A next-layer node of the initial node is a participant node, and a next-layer node of the participant node is a logic gate node. When the target candidate execution action with the highest priority is outputted to the lower-layer node, the $i^{th}$ round of static game ends. The candidate execution actions of the participant nodes are in a one-to-one correspondence with the logic distribution nodes. Arrangement combinations of the candidate execution actions corresponding to the at least two participant nodes are in a one-to-one correspondence with the logic gate nodes.

Step 502: Simulate a game result on each path in the Monte-Carlo tree.

The game result is a result of a winner and a loser produced by a participant in the game service after executing an execution action. In some embodiments, the game result includes a benefit corresponding to the path in the Monte-Carlo tree. After the game result is generated, the game service ends. The path in the Monte-Carlo tree is a path formed by all nodes from a single leaf node to the root node. The leaf node is a node corresponding to termination of the game service. The candidate execution actions corresponding to the participants may be simulated along a plurality of paths, and each path corresponds to a game result.

During simulation, a plurality of methods may be used, for example, may be the same as the traditional MCTS algorithm, or the method provided in the embodiments of this application is used for simulating the game result on each path in combination with the logic distribution node and the logic gate node. The $i^{th}$ round of game is used as an example. Each participant node selects an execution action randomly or according to a specific rule. Arrangement combination is performed on the candidate execution actions corresponding to the at least two participant nodes. The target candidate execution action with the highest priority is selected from the at least two candidate execution actions until the game service ends.

Step 503: Backpropagate benefits of the game results corresponding to multiple paths in the Monte-Carlo tree to a highest-layer AI participant node of the AI participant in the Monte-Carlo tree.

The benefits of the game result are benefits that can be obtained by all participants after the game result is generated in the game service. For example, in a roshambo service, there are three participants. A game rule is that 10 points are accumulated for each win and 5 points are deducted for each failure. In a game, if a user 1 is a winner and a user 2 and a user 3 are losers, the user 1 accumulates 10 points, and both the user 2 and the user 3 have −5 points. Therefore, benefits obtained by the user 1 after the user 1 wins is an increase of 10 points, and the user 2 and the user 3 have a decrease of 5 points after the failure.

In the $i^{th}$ round of game, the benefits of the game result corresponding to each path are backpropagated to the highest-layer AI participant node in the Monte-Carlo tree corresponding to the $i^{th}$ round. As shown in FIG. 2, the benefits of the game result corresponding to each path are backpropagated to the participant node 1. A process of backpropagation in the $i^{th}$ round of game is as follows: The benefits corresponding to the game result are backpropagated from the lower-layer node to the logic gate node 103 in the $i^{th}$ round of game. The logic gate node 103 backpropagates the benefits corresponding to the game result to the three logic distribution nodes 102 corresponding to the logic gate node 103. The three logic distribution nodes 102 backpropagate the benefits corresponding to the game result to the participant nodes respectively corresponding to the three logic distribution nodes 102. The three participant nodes backpropagate the benefits corresponding to the game result to the action distribution node 101. The action distribution node 101 backpropagates the benefits corresponding to the game result to the participant node 1 (that is, the highest-layer AI participant node in the Monte-Carlo tree corresponding to the $i^{th}$ round).

Step 504: Select an execution action of the highest-layer AI participant node on a path that has the highest benefit, and output the execution action as an AI execution action of the AI participant in the $i^{th}$ round of game.

Benefits of game results corresponding to all paths are compared to select a path with highest benefit. An execution action on the path is selected and outputted as an AI execution action of the AI participant in the $i^{th}$ round of game.

When the game service includes a roshambo service, the execution action corresponding to the participant node includes at least two of the following execution actions: executing a hand outstretching action corresponding to rock, executing a hand outstretching action corresponding to scissors, and executing a hand outstretching action corresponding to paper. Alternatively, when the game service includes a Mahjong service, the execution action corresponding to the participant node includes at least two of the following execution actions: taking a tile, discarding a tile, chow, pung, kong, and win. Alternatively, when the game service includes a sealed-bid auction service, the execution action corresponding to the participant node includes the following two execution actions: a bidding action and a bidding dropping action. The sealed-bid auction means that all buyers participating in the auction write desired prices on papers and put the papers in envelopes. During bidding, the envelopes of all the buyers are opened, and a higher bidder can buy an item being auctioned.

For example, a participant node 1 is the highest-layer AI participant node. When executing an action "discard Yiwan", the participant node 1 triggers a participant node 2, a participant node 3, and a participant node 4 to enter a static game process. Actions that may be executed by the participant node 2, the participant node 3, and the participant node 4 are simulated. Illustratively, a path corresponding to an action "chow Yiwan" executed by the participant node 2 is simulated. The path corresponds to first benefits of a game result. A path corresponding to an action "pung Yiwan" executed by the participant node 3 is simulated. The path corresponds to second benefits of a game result. A path corresponding to an action "take a tile" executed by the participant node 4 is simulated. The path corresponds to third benefits of a game result. The benefits of the game results in the above three cases are backpropagated to the participant node 1 along respective paths. Average benefits V1 of the game result corresponding to execution of the action "discard Yiwan" by the participant node 1 may be calculated. Similarly, when the participant node 1 executes an action "discard Jiutiao", each path in this case is simulated in the foregoing manner, and benefits of a game result on each path in this case are obtained. Alternatively, average benefits V2 of a game result corresponding to execution of the action "discard Jiutiao" by the participant node 1 may be calculated. By analogy, average benefits of game results corresponding to execution of different actions by the participant node 1 are calculated. Illustratively, the benefits of the game result corresponding to a path of the action "discard Yiwan" executed by the participant node 1 are highest. In this case, the participant node 1 selects to execute the action "discard Yiwan".

In conclusion, in the method provided in this embodiment, in the $i^{th}$ round of game in the game service including the static game, the initial node, the at least two logic distribution nodes, and the at least two logic gate nodes that correspond to the static game are disposed in the Monte-Carlo tree constructed in correspondence with the $i^{th}$ round of game. In this way, during the static game, the execution action of the participant may be transferred to the lower-layer node unidirectionally, and benefits of the game result may be backpropagated to an upper-layer node unidirectionally. Therefore, information does not flow bidirectionally, and normal search can be performed by using the MCTS algorithm when the game service including the static game is executed.

FIG. 5 is a flowchart of a method for constructing a Monte-Carlo tree corresponding to an $i^{th}$ round of game according to an exemplary embodiment of this application. The method may be applied to the server 140 in the computer system shown in FIG. 3. The method includes the following steps:

Step 601: Construct each layer of node in the Monte-Carlo tree from a root node in the $i^{th}$ round of game in the game service.

Figure 6:
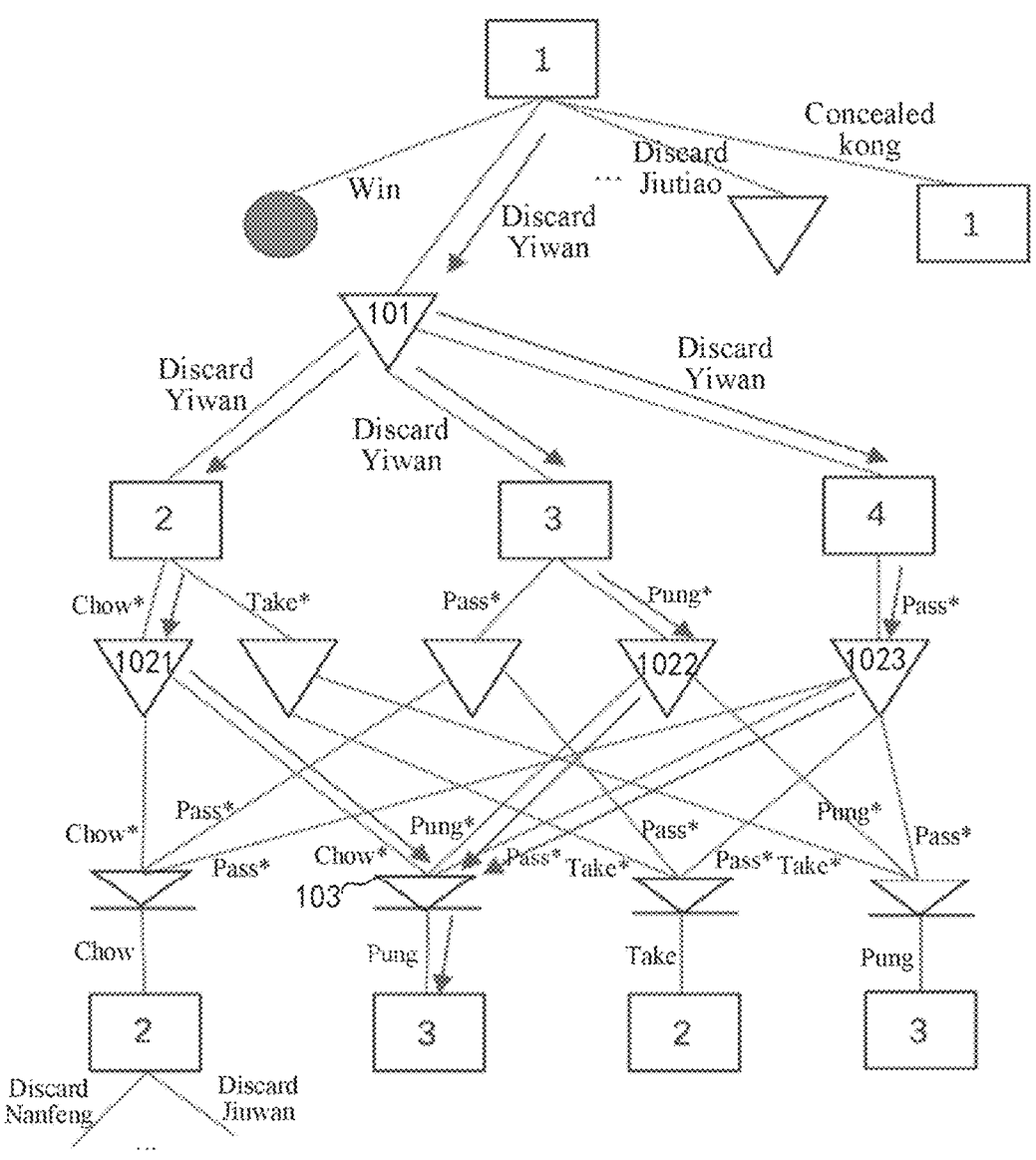
FIG. 6 is a schematic structural diagram of a Monte-Carlo tree of a game service based on artificial intelligence according to another exemplary embodiment of this application.

The root node is a node corresponding to an initial state of a situation corresponding to the game service before the service starts. For example, an MCTS algorithm is applied to a Go game. The root node in the Monte-Carlo tree is a node corresponding to a blank board on which two partici- pants have not laid stones. The Monte-Carlo tree is a recursive data structure. Each round of game may be con- sidered as a subtree of the Monte-Carlo tree, for example, the $i^{th}$ round of game corresponds to a subtree of the $i^{th}$ round of game. When a node is selected for simulation, the selected node is a root node of the subtree. In this embodiment of this application, the Monte-Carlo tree corresponding to the $i^{th}$ round is used as an example. The root node is a root node in the Monte-Carlo tree corresponding to the $i^{th}$ round of game. As shown in FIG. 6, in the $i^{th}$ round of game, the root node in the Monte-Carlo tree is a participant node 1.

Step 602: Perform expansion to the Monte-Carlo tree by using the at least two participant nodes participating in the static game as $(j+1)^{th}$-layer nodes in the Monte-Carlo tree when a $j^{th}$-layer node includes an initial node used for triggering the static game, where j is an integer greater than 1.

An action distribution node corresponding to the execu- tion action is set, when an execution action corresponding to the participant node at a $(j-1)^{th}$ layer is an execution action used for triggering the static game, at a $j^{th}$ layer as the initial node used for triggering the static game (j is an integer greater than 1). The action distribution node is configured to forward an execution action corresponding to a participant node to participant nodes corresponding to at least two participants participating in the static game.

For example, as shown in FIG. 6, the participant node 1 is at the $(j-1)^{th}$ layer, and the action distribution node 101 is at the $j^{th}$ layer. The action distribution node 101 is used as the initial node used for triggering the static game. The partici- pant node 1 may execute many actions. This is related to tile information known by the participant node 1. The partici- pant node 1 may execute an action "discard Yiwan", or execute an action "discard Jiutiao", or execute an action "produce a concealed kong" (a "concealed kong" means that a participant has four identical tiles in the Mahjong service, and the participant usually notifies other participants of possession of the four identical tiles by placing the back of the four tiles upwards, but other participants do not know tile information of the four tiles). For example, the participant node 1 discards a tile with tile information "Yiwan". After the participant node 1 executes the action "discard Yiwan", the action distribution node 101 triggers a participant node 2, a participant node 3, and a participant node 4 to enter a static game process. The action distribution node 101 for- wards the action executed by the participant node 1 to the participant node 2, the participant node 3, and the participant node 4. The participant node 2, the participant node 3, and the participant node 4 are used as the $(j+1)^{th}$ layer in the expanded Monte-Carlo tree.

It is understandable that the $(j-1)^{th}$ layer in the Monte- Carlo tree is an upper layer of the $j^{th}$ layer, where j is an integer greater than 1. When the $j^{th}$-layer node is the initial node used for triggering the static game, there is certainly a layer of node at an upper layer of this layer of node, such as the participant node 1 shown in FIG. 6 and a start node 11 shown in FIG. 9. Therefore, the initial node (the $j^{th}$-layer node) certainly is not the first-layer node in a round of static game.

Step 603: Predict m candidate execution actions corre- sponding to the at least two participant nodes in the static game, and perform expansion to the Monte-Carlo tree by using m logic distribution nodes in a one-to-one correspon- dence with the m candidate execution actions as $(j+2)^{th}$- layer nodes in the Monte-Carlo tree, where m is a positive integer.

With reference to FIG. 6, candidate execution actions of the three participant nodes are predicted. FIG. 6 only shows some predicted candidate execution actions of the partici- pant nodes. Candidate execution actions that cannot be executed are not shown in the figure. Corresponding logic distribution nodes are not disposed for these execution actions. For example, FIG. 6 does not show the action "pung" executed by all the participant node 2, the participant node 3, and the participant node 4 and a corresponding logic distribution node 102. Illustratively, the participant node 2 corresponds to two candidate execution actions in the static game: "chow" and "take a tile". Expansion is performed to use two logic distribution nodes 102 (including the logic distribution node 1021 corresponding to the participant node 2, the logic distribution node 1022 corresponding to the participant node 3, and the logic distribution node 1023 corresponding to the participant node 4) in a one-to-one correspondence with the two candidate execution actions as the $(j+2)^{th}$-layer nodes in the Monte-Carlo tree. By analogy, this is applicable to the participant node 3 and the participant node 4. Illustratively, five logic distribution nodes are dis- posed in the $(j+2)^{th}$-layer nodes in the Monte-Carlo tree.

Step 604: Predict P arrangement combinations corre- sponding to the m candidate execution actions, and perform expansion to the Monte-Carlo tree by using P logic gate nodes in a one-to-one correspondence with the P arrange- ment combinations as $(j+3)^{th}$-layer nodes in the Monte- Carlo tree, where each logic gate node is configured to output a target candidate execution action with a highest priority of at least two candidate execution actions in a same arrangement combination to the lower-layer node, and P is a positive integer.

For example, as shown in FIG. 6, the participant node 2 has two candidate execution actions ("chow" and "take a tile"), the participant node 3 has two candidate execution actions ("pass" and "pung"), and the participant node 4 has one candidate execution action ("pass"). In this case, four arrangement combinations corresponding to the five candi- date execution actions are predicted. The predicted four arrangement combinations are as follows:

(the participant node 2 chow*, the participant node 3 pass*, the participant node 4 pass*)→the participant node 2 chow;

(the participant node 2 chow*, the participant node 3 pung*, the participant node 4 pass*)→the participant node 3 pung;

(the participant node 2 take*, the participant node 3 pass*, the participant node 4 pass*)→the participant node 2 take; and (the participant node 2 take*, the participant node 3 pung*, the participant node 4 pass*)→the participant node 3 pung.

Expansion is performed to use four logic gate nodes 103 in a one-to-one correspondence with the four arrangement combinations as the $(j+3)^{th}$-layer nodes in the Monte-Carlo tree. According to a Mahjong rule, a priority of "pung" is higher than a priority of "chow". Therefore, in the second arrangement combination, the logic gate node 103 outputs the execution action "pung" to a lower-layer node as the target candidate execution action. The lower-layer node is the participant node 3 in a next round of game.

At this point, construction of the Monte-Carlo tree cor- responding to the $i^{th}$ round of static game is completed. With iteration of rounds, the Monte-Carlo tree continues to be expanded downwards layer by layer in the foregoing manner, until the game ends. A round of a dynamic game may be constructed in a manner in related technologies.

A simulation process of one path is described. The action "discard Yiwan" executed by the participant node 1 is simulated. The action distribution node 101 forwards the action "discard Yiwan" to the participant node 2, the participant node 3, and the participant node 4. The action "chow Yiwan" executed by the participant node 2, the action "pung Yiwan" executed by the participant node 3, and the action "pass" executed by the participant node 4 are simulated. The participant node 2 forwards the action "chow Yiwan" to the logic gate node 103 by using the logic distribution node 1021. The participant node 3 forwards the action "pung Yiwan" to the logic gate node 103 by using the logic distribution node 1022. The participant node 4 forwards the action "pass" to the logic gate node 103 by using the logic distribution node 1023. According to a Mahjong rule, a priority of the execution action "pung" is higher than a priority of the execution action "chow". Therefore, the logic gate node 103 selects to output the execution action "pung Yiwan" to the participant node 3.

In conclusion, in the method provided in this embodiment, the Monte-Carlo tree corresponding to the $i^{th}$ round of static game is expanded by using the initial node used for triggering the static game as the root node. The action distribution node is used as the initial node used for triggering the static game. The logic distribution node and the logic gate node are disposed in the Monte-Carlo tree. In this way, in a game service including a static game, for example, the Mahjong service, an execution action of a participant node during a dynamic game can be expanded downwards unidirectionally to a participant node corresponding to the static game.

FIG. 7 is a flowchart of a method for backpropagating benefits of a game result corresponding to each path to a highest-layer AI participant node according to an exemplary embodiment of this application. The method may be applied to the server 140 in the computer system shown in FIG. 3. The method includes the following steps:

Step 801: Backpropagate the benefits corresponding to the game result from a leaf node in the Monte-Carlo tree to the at least two logic gate nodes.

The leaf node is a node corresponding to termination of a game service. In an $i^{th}$ round of game of a game service including a static game, at least two logic gate nodes are disposed in a Monte-Carlo tree corresponding to the $i^{th}$ round of game. Benefits corresponding to a game result are transferred upwards layer by layer from the leaf node. When the benefits are transferred to the Monte-Carlo tree corresponding to the $i^{th}$ round of game, the benefits of the game result are transferred to the at least two logic gate nodes.

Step 802: Backpropagate the benefits corresponding to the game result from the logic gate nodes to the initial node.

It is assumed that the logic gate node is a $(j+3)^{th}$-layer node in the Monte-Carlo tree. In the Monte-Carlo tree corresponding to the $i^{th}$ round of game in the static game, transfer of the benefits corresponding to the game result includes the following steps:

Step 8021: Backpropagate the benefits of the game result corresponding to each path from P logic gate nodes to m logic distribution nodes that are of $(j+2)^{th}$-layer nodes and that correspond to the P logic gate nodes.

Figure 8:
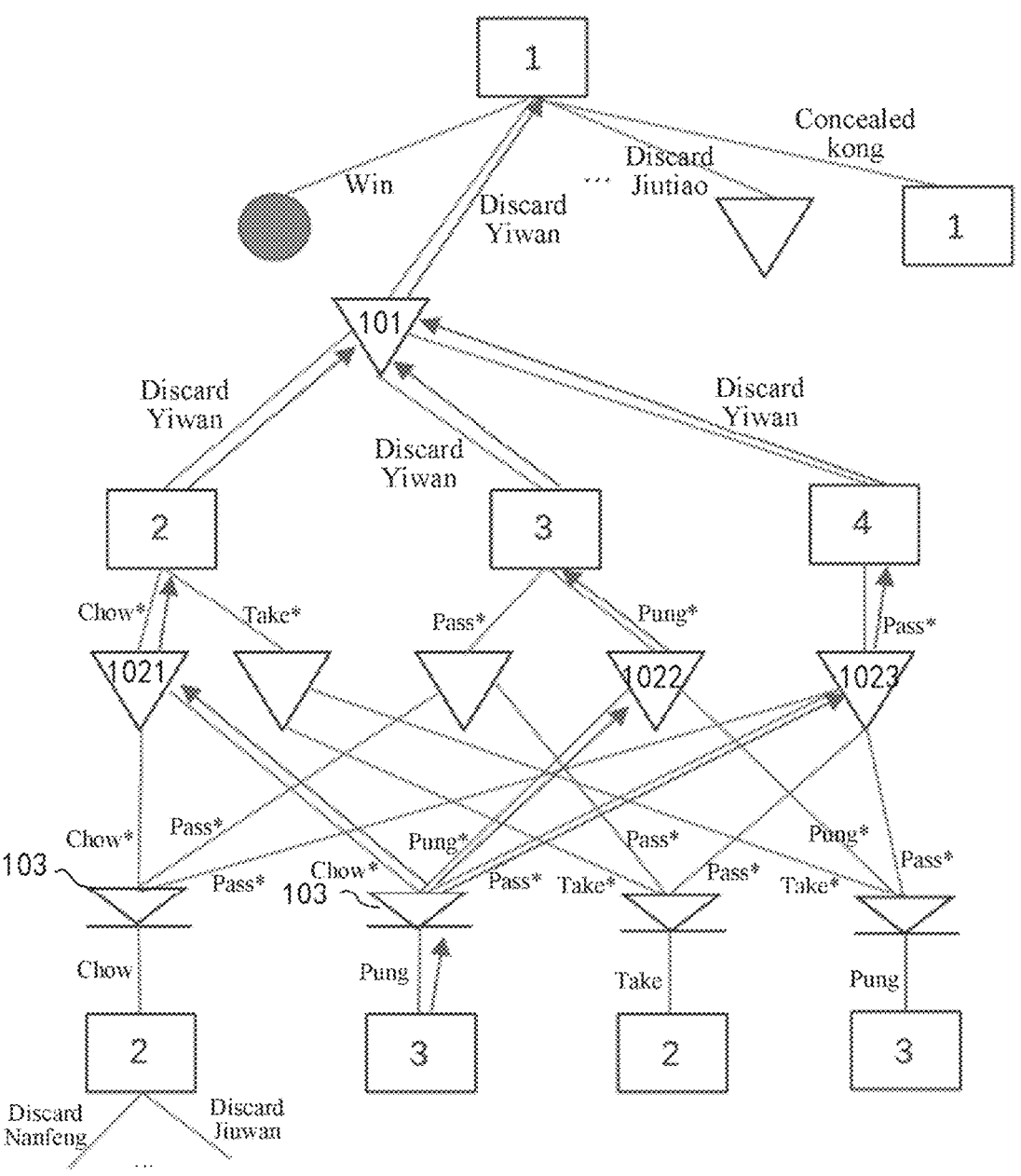
FIG. 8 is a schematic structural diagram of a Monte-Carlo tree of a Mahjong service based on artificial intelligence according to an exemplary embodiment of this application.

For example, as shown in FIG. 8, in the Monte-Carlo tree corresponding to the $i^{th}$ round of game, four paths correspond to four logic gate nodes. Benefits of a game result corresponding to each of the four paths are backpropagated to the four logic gate nodes. The four logic gate nodes backpropagate the benefits of the game result corresponding to each of the four paths to five logic distribution nodes that are of the $(j+2)^{th}$-layer nodes and that correspond to the four logic gate nodes.

A process of backpropagating benefits of a game result corresponding to a single path is described. The second path on the left in FIG. 8 is used as an example. An execution action corresponding to the path is: (a participant node 2 chow*, a participant node 3 pung*, a participant node 4 pass*)→the participant node 3 pung. Illustratively, benefits of a game result corresponding to the path are 5. The participant node 3 backpropagates the benefits corresponding to the game result to the target logic gate node 103 at the $(j+3)^{th}$ layer in the Monte-Carlo tree corresponding to the $i^{th}$ round of game (as shown by an arrow in the figure). The logic gate node 103 backpropagates the benefits corresponding to the game result to three logic distribution nodes that are of the $(j+2)^{th}$-layer nodes and that correspond to the logic gate node 103. To be specific, the benefits corresponding to the game result are backpropagated to the logic distribution node 1021 corresponding to the action "chow" executed by the participant node 2, the logic distribution node 1022 corresponding to the action "pung" executed by the participant node 3, and the logic distribution node 1023 corresponding to the action "pass" executed by the participant node 4. In this case, the benefits of the game result are 5.

Step 8022: Backpropagate the benefits corresponding to the game result corresponding to each path from the m logic distribution nodes to at least two participant nodes that are of $(j+1)^{th}$-layer nodes and that correspond to the m logic distribution nodes.

For example, as shown in FIG. 8, benefits of game results corresponding to each of four paths in the Monte-Carlo tree corresponding to the $i^{th}$ round of game are backpropagated to three participant nodes.

A process of backpropagating benefits of a game result corresponding to a single path is described. The logic distribution node 1021 backpropagate the benefits corresponding to the game result to the participant node 2. The logic distribution node 1022 backpropagates the benefits corresponding to the game result to the participant node 3. The logic distribution node 1023 backpropagates the benefits corresponding to the game result to the participant node 4. In this case, the benefits corresponding to the game result are 5.

Step 803: Calculate average benefits corresponding to the static game by using the initial node.

For example, the initial node is the action distribution node 101. The participant node 2, the participant node 3, and the participant node 4 separately backpropagate the benefits corresponding to the game result to the action distribution node 101. The action distribution node 101 calculates average benefits of each participant on all paths. For example, average benefits corresponding to the participant node 1, the participant node 2, the participant node 3, and the participant node 4 are an average V1, an average V2, an average V3, and an average V4 respectively.

Step 804: Backpropagate the average benefits from the initial node to the highest-layer AI participant node of the AI participant in the Monte-Carlo tree.

For example, the participant node 1 is an AI participant and is at the highest layer in the Monte-Carlo tree corresponding to the $i^{th}$ round of game. The average benefit corresponding to each participant node is backpropagated to the participant node 1. The participant node 1 outputs an execution action on a path with a maximum average benefit as an AI execution action of the participant node 1 in the i$^{th}$ round of game.

A benefit of a game result obtained by a participant node is obtained by accumulating benefits of game results of all paths in the (i+1)$^{th}$ round of game and the i$^{th}$ round of game. The benefits are accumulated at the participant node in each round. For example, the participant node 2 executes a path corresponding to the action "chow". According to a Mahjong rule, the participant node 2 needs to discard a tile after executing "chow". Therefore, this triggers the (i+1)$^{th}$ round of static game. Assuming that a benefit of a game result corresponding to the participant node 2 is 5, in the i$^{th}$ round of static game, a benefit of a game result corresponding to the participant node 2 is 10 (a benefit of a game result corresponding to the (i+1)$^{th}$ round of static game is accumulated). A benefit obtained after accumulating at a participant node is sent to the action distribution node for recording. The action distribution node also records an execution action of each participant and a benefit corresponding to the action in a current round.

In conclusion, in the method provided in this embodiment, the action distribution node, the logic distribution node, and the logic gate node are disposed in the Monte-Carlo tree corresponding to the i$^{th}$ round of static game. In this way, in a game service including a static game, for example, a Mahjong service, the logic gate node backpropagates the benefit corresponding to the game result to the corresponding logic distribution node. Then, the logic distribution node backpropagates the benefit corresponding to the game result to a corresponding participant node. Finally, the action distribution node calculates average benefits of each participant node on all paths, and the average benefits are backpropagated to an upper-layer node. This ensures that information can be propagated upwards to a corresponding node unidirectionally during backpropagation.

In the foregoing embodiments, an example in which the game service includes the Mahjong service (including both a dynamic game and a static game) is used. The method provided in the embodiments of this application is described below, where the game service includes a roshambo service (only including a static game) in the form of rock, scissors, and paper.

Figure 9:
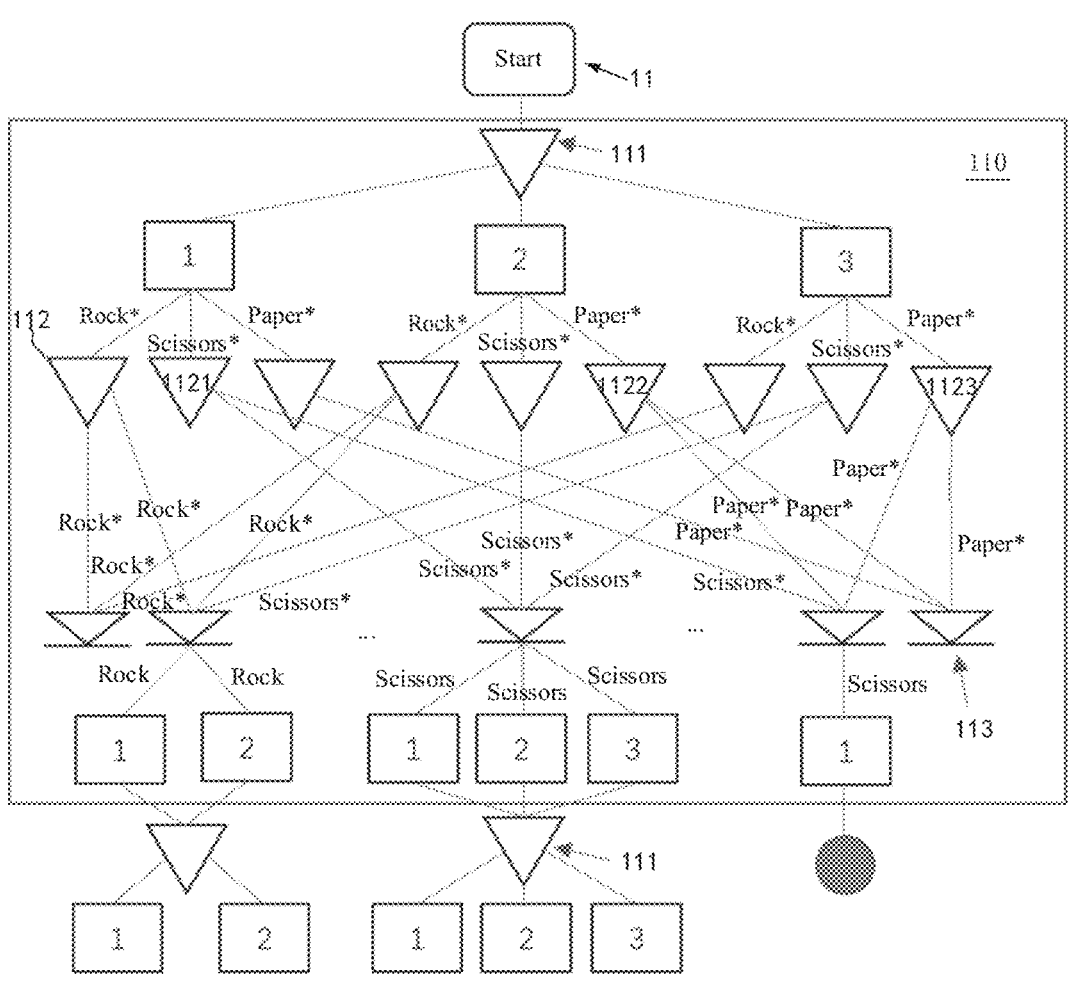
FIG. 9 is a schematic structural diagram of a Monte-Carlo tree of a roshambo service based on artificial intelligence according to an exemplary embodiment of this application.

With reference to FIG. 9, illustratively, i is 1 and j is 1. In the first round of roshambo service, a Monte-Carlo tree corresponding to the first round of game is constructed. A structure 110 of the Monte-Carlo tree includes: an initial node, that is, an action distribution node 111, a participant node 1, a participant node 2, a participant node 3, nine logic distribution nodes, and five logic gate nodes that correspond to the first round of game. FIG. 9 does not show logic distribution nodes and logic gate nodes corresponding to all execution actions.

The start node means the start of a game. In this embodiment, the start node also functions as a referee, and is responsible for recording a quantity of wins and a quantity of failures of each participant. The action distribution node 111 triggers a static game process. The action distribution node 111 is at the first layer in the Monte-Carlo tree. Expansion is performed to use a participant node as a second-layer node in the Monte-Carlo tree. Candidate execution actions of the participant node 1, the participant node 2, and the participant node 3 are predicted. Each participant node has three candidate execution actions. Expansion is performed to use nine logic distribution nodes 112 corresponding to nine candidate execution actions corresponding to the three participant nodes as third-layer nodes in the Monte-Carlo tree. 27 arrangement combinations corresponding to the nine candidate execution actions are predicted. Expansion is performed to use 27 logic gate nodes 113 (FIG. 9 only shows some logic gate nodes) in a one-to-one correspondence with the 27 arrangement combinations as fourth-layer nodes in the Monte-Carlo tree.

Illustratively, the participant node 1 is a node corresponding to an AI participant. For example, after the participant node 1 executes the hand outstretching action corresponding to scissors, the roshambo service ends. An execution action corresponding to each participant node on a single path is simulated. On this path, the participant node 1 executes a hand outstretching action corresponding to scissors, the participant node 2 executes a hand outstretching action corresponding to paper, and the participant node 3 executes a hand outstretching action corresponding to paper. The logic distribution node 1121 corresponding to the participant node 1, the logic distribution node 1122 corresponding to the participant node 2, and the logic distribution node 1123 corresponding to the participant node 3 forward the execution actions of the participant nodes to the logic gate node 113. According to a rule of the roshambo service, a target candidate execution action with a highest priority outputted by the logic gate node 113 to the participant node 1 is the hand outstretching action corresponding to scissors. The participant node 1 executes the hand outstretching action corresponding to scissors. This round of roshambo service ends.

The participant node 1 backpropagates a benefit corresponding to a game result to the logic gate node 113. The logic gate node 113 backpropagates the benefit corresponding to the game result to the logic distribution node 1121, the logic distribution node 1122, and the logic distribution node 1123. The three logic distribution nodes backpropagate the benefit corresponding to the game result to the three participant nodes. Illustratively, the participant nodes record respective quantities of wins and points. For example, the participant node 1 records one win and accumulates 10 points. The participant node 2 and the participant node 3 each record one failure and accumulate −5 points. The three participant nodes backpropagate benefits of game results recorded by the three participant nodes to the action distribution node 111. The action distribution node 111 backpropagates the benefits corresponding to the game results to an upper-layer node (that is, the start node). The action distribution node 111 calculates average benefits of game results of each participant node on all paths. Illustratively, the foregoing path is a path with a maximum average benefit of the participant node 1. An execution action of the participant node 1 on this path is selected and outputted as the hand outstretching action corresponding to scissors executed by the participant node 1 in the first round of game.

In conclusion, in the method provided in the embodiments, the action distribution node, the logic distribution nodes, and the logic gate nodes are disposed in the Monte-Carlo tree corresponding to the roshambo service. In this way, during the static game, the Monte-Carlo tree may be expanded downwards unidirectionally, and the benefit of the game result may be backpropagated upwards unidirectionally. This solves a problem that normal search cannot be performed by using the MCTS algorithm when a static game service is executed.

It is understandable that when the method provided in the embodiments of this application is applied to the Mahjong game, a game developer may use a game interface to display a tile recommended by AI to a user participating in the game to discard in a current situation. As shown in FIG. 10, the game interface displays information about the tile recommended to the user to discard and a probability of discarding a tile. A probability of discarding a tile is associated with a probability of winning to some extent. The user may determine, according to the information about the tile recommended by AI to discard, a tile to be discarded or an action to be executed. This improves a winning probability of the user in the Mahjong game. The method provided in the embodiments of this application may be applied to various types of Mahjong games with a plurality of playing rules, for example, national-standard Mahjong, Guangdong Mahjong, Wuhan Mahjong, common Mahjong, and two-person Mahjong (a popular two-person game developed by Tencent), and may also be applied to Mahjong games with playing rules such as "Blood Flow Forms a River", "Fight to the End", and "Kawuxing" ("Blood Flow Forms a River" and "Fight to the End" are popular in Sichuan Mahjong, and Kawuxing is characterized by simplicity).

The following is an apparatus embodiment of this application. For details not described in detail in the apparatus embodiment, reference may be made to corresponding record in the foregoing method embodiments. Details are not described herein again.

Figure 11:
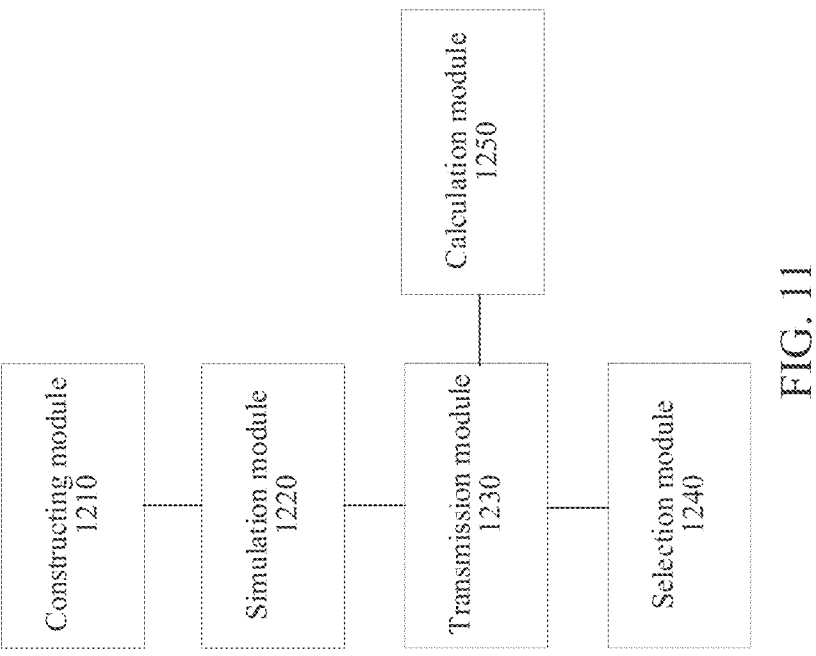
FIG. 11 is a block diagram of a game service execution apparatus based on artificial intelligence according to an exemplary embodiment of this application.

FIG. 11 is a schematic structural diagram of a game service execution apparatus based on artificial intelligence according to an exemplary embodiment of this application. The apparatus may be implemented as the entirety or a part of a terminal through software, hardware, or a combination thereof. The apparatus includes: a constructing module 1210, a simulation module 1220, a transmission module 1230, and a selection module 1240.

The constructing module 1210 is configured to construct, in an $i^{th}$ round of game in the game service including a static game, a Monte-Carlo tree corresponding to the $i^{th}$ round of game, where the Monte-Carlo tree includes: an initial node, at least two participant nodes, at least two logic distribution nodes, and at least two logic gate nodes that correspond to the static game, the logic distribution node is configured to forward, according to an arrangement combination, candidate execution actions corresponding to the at least two participant nodes in the static game to different logic gate nodes, each logic gate node is configured to output a target candidate execution action with a highest priority of at least two candidate execution actions in a same arrangement combination to a lower-layer node according to the game rule, and i is a positive integer.

The simulation module 1220 is configured to simulate a game result on each path in the Monte-Carlo tree.

The transmission module 1230 is configured to back-propagate benefits of the game result corresponding to each path to a highest-layer AI participant node of the AI participant in the Monte-Carlo tree.

The selection module 1240 is configured to: select an execution action of the highest-layer AI participant node on a path that has the highest benefit, and output the execution action as an AI execution action of the AI participant in the $i^{th}$ round of game.

In an embodiment, the constructing module 1210 is configured to construct each layer of node in the Monte-Carlo tree from a root node in the $i^{th}$ round of game in the game service.

The constructing module 1210 is configured to perform expansion to the Monte-Carlo tree by using the at least two participant nodes participating in the static game as $(j+1)^{th}$-layer nodes in the Monte-Carlo tree when a $j^{th}$-layer node includes an initial node used for triggering the static game, where j is an integer greater than 1.

The constructing module 1210 is configured to: predict m candidate execution actions corresponding to the at least two participant nodes in the static game, and perform expansion to the Monte-Carlo tree by using m logic distribution nodes in a one-to-one correspondence with the m candidate execution actions as $(j+2)^{th}$-layer nodes in the Monte-Carlo tree, where m is a positive integer.

The constructing module 1210 is configured to: predict P arrangement combinations corresponding to the m candidate execution actions, and perform expansion to the Monte-Carlo tree by using P logic gate nodes in a one-to-one correspondence with the P arrangement combinations as $(j+3)^{th}$-layer nodes in the Monte-Carlo tree, where each logic gate node is configured to output a target candidate execution action with a highest priority of at least two candidate execution actions in a same arrangement combination to the lower-layer node, and P is a positive integer.

In an embodiment, the apparatus includes a calculation module 1250.

The transmission module 1230 is configured to back-propagate the benefits corresponding to the game result from a leaf node in the Monte-Carlo tree to the at least two logic gate nodes.

The transmission module 1230 is configured to back-propagate the benefits corresponding to the game result from the logic gate nodes to the initial node.

The calculation module 1250 is configured to calculate average benefits corresponding to the static game by using the initial node.

The transmission module 1230 is configured to back-propagate the average benefits from the initial node to the highest-layer AI participant node of the AI participant in the Monte-Carlo tree.

In an embodiment, the logic gate nodes are set as $(j+3)^{th}$-layer nodes in the Monte-Carlo tree.

The transmission module 1230 is configured to back-propagate the benefits of the game result corresponding to each path from P logic gate nodes to m logic distribution nodes that are of $(j+2)$ layer nodes and that correspond to the P logic gate nodes, where P and m are both positive integers, and j is an integer greater than 1.

The transmission module 1230 is configured to back-propagate the benefits corresponding to the game result corresponding to each path from the m logic distribution nodes to at least two participant nodes that are of $(j+1)^{th}$-layer nodes and that correspond to the m logic distribution nodes.

In an embodiment, the constructing module 1210 is configured to set, when an execution action corresponding to the participant node at a $(j-1)^{th}$ layer is an execution action used for triggering the static game, an action distribution node corresponding to the execution action at a $j^{th}$ layer as the initial node used for triggering the static game, where j is an integer greater than 1.

The action distribution node is configured to forward the execution action corresponding to the participant node to the participant nodes corresponding to the at least two participants participating in the static game.

In an embodiment, when the game service includes a roshambo service, the execution action corresponding to the participant node includes at least two of the following execution actions: executing a hand outstretching action corresponding to rock, executing a hand outstretching action corresponding to scissors, and executing a hand outstretching action corresponding to paper. Alternatively, when the game service includes a Mahjong service, the execution action corresponding to the participant node includes at least two of the following execution actions: taking a tile, discarding a tile, chow, pung, kong, and win. Alternatively, when the game service includes a sealed-bid auction service, the execution action corresponding to the participant node includes the following two execution actions: a bidding action and a bidding dropping action.

In this application, the term "unit" or "module" refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit.

Figure 12:
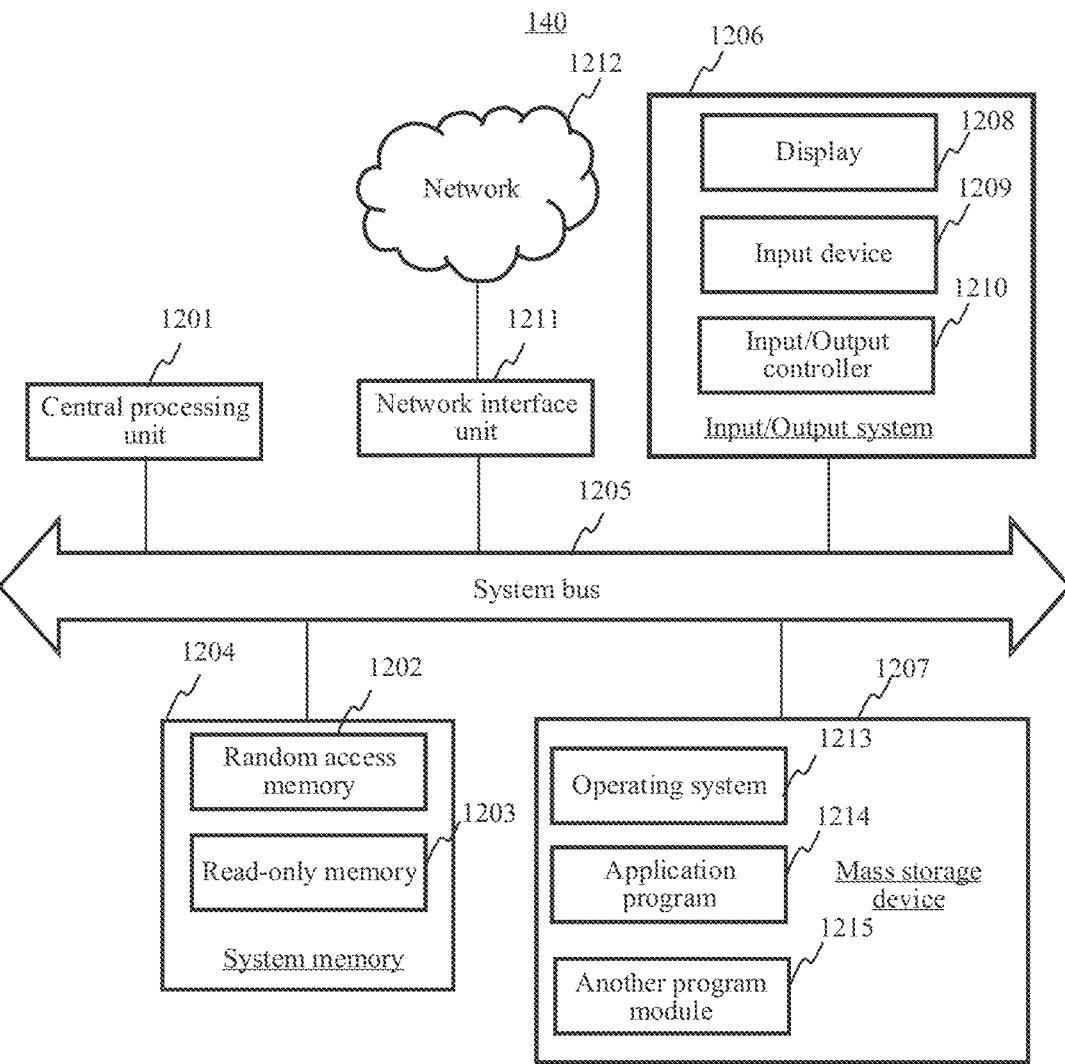
FIG. 12 is a schematic diagram of a structure of an apparatus of a server according to an exemplary embodiment of this application.

FIG. 12 is a schematic structural diagram of a server according to an exemplary embodiment of this application. The server may be the server 140 in the computer system 120 shown in FIG. 1.

A server 140 includes a central processing unit (CPU) 1201, a random access memory (RAM) 1202, a system memory 1204 of a read only memory (ROM) 1203, and a system bus 1205 connecting the system memory 1204 to the CPU 1201. The server 1200 further includes a basic input/output (I/O) system 1206 assisting in transmitting information between devices in a computer, and a mass storage device 1207 configured to store an operating system 1213, an application program 1214 and another program module 1215.

The basic I/O system 1206 includes a display 1208 configured to display information and an input device 1209 such as a mouse or a keyboard configured to input information by a user. The display 1208 and the input device 1209 are both connected to the CPU 1201 by using an input/output controller 1210 that is connected to the system bus 1205. The basic I/O system 1206 may further include the input/output controller 1210 configured to receive and process input from a plurality of other devices such as a keyboard, a mouse, or an electronic stylus. Similarly, the input/output controller 1210 further provides an output to a display screen, a printer, or another type of output device.

The mass storage device 1207 is connected to the CPU 1201 by using a mass storage controller (not shown) connected to the system bus 1205. The mass storage device 1207 and a computer-readable medium associated with the mass storage device 1207 provide non-volatile storage for the server 140. That is, the mass storage device 1207 may include a computer-readable medium (not shown) such as a hard disk or a compact disc read only memory (CD-ROM) drive.

The computer-readable medium may include a computer storage medium and a communication medium. The computer storage medium includes volatile and non-volatile media, and removable and non-removable media implemented by using any method or technology used for storing information such as computer-readable instructions, data structures, program modules, or other data. The computer storage medium includes a RAM, a ROM, an erasable programmable ROM (EPROM), an electrically erasable programmable ROM (EEPROM), a flash memory or another solid-state memory technology, a CD-ROM, a digital versatile disc (DVD), a solid state drive (SSD) or another optical memory, a magnetic cassette, a magnetic tape, a magnetic disk memory, or another magnetic storage device. The RAM may include a resistance random access memory (ReRAM) and a dynamic random access memory (DRAM). Certainly, a person skilled in the art may know that the computer storage medium is not limited to the foregoing types. The system memory 1204 and the mass storage device 1207 may be collectively referred to as a memory.

According to various embodiments of this application, the server 140 may further be connected, by using a network such as the Internet, to a remote computer on the network and run. That is, the server 140 may be connected to a network 1212 by using a network interface unit 1211 that is connected to the system bus 1205, or may be connected to a network of another type or a remote computer system (not shown) by using the network interface unit 1211.

The memory further includes one or more programs, which are stored in the memory and are configured to be executed by the CPU.

In an embodiment, a computer device is provided. The computer device includes a processor and a memory, the memory stores at least one instruction and at least one set of program, code set, or instruction set, and the at least one instruction and the at least one set of program, code set, or instruction set is loaded and executed by a processor to perform the foregoing game service execution method based on artificial intelligence.

In an embodiment, a non-transitory computer-readable storage medium is provided. The storage medium stores at least one instruction and at least one set of program, code set, or instruction set, and the at least one instruction and the at least one set of program, code set, or instruction set are loaded and executed by a processor to perform the foregoing game service execution method based on artificial intelligence.

In some embodiments, the computer-readable storage medium may include: a read-only memory (ROM), a RAM, a solid state drive (SSD), an optical disc, or the like. The RAM may include a resistance random access memory (ReRAM) and a dynamic random access memory (DRAM). The sequence numbers of the foregoing embodiments of this application are merely for description purpose, and are not intended to indicate the preference among the embodiments.

Figure 13:
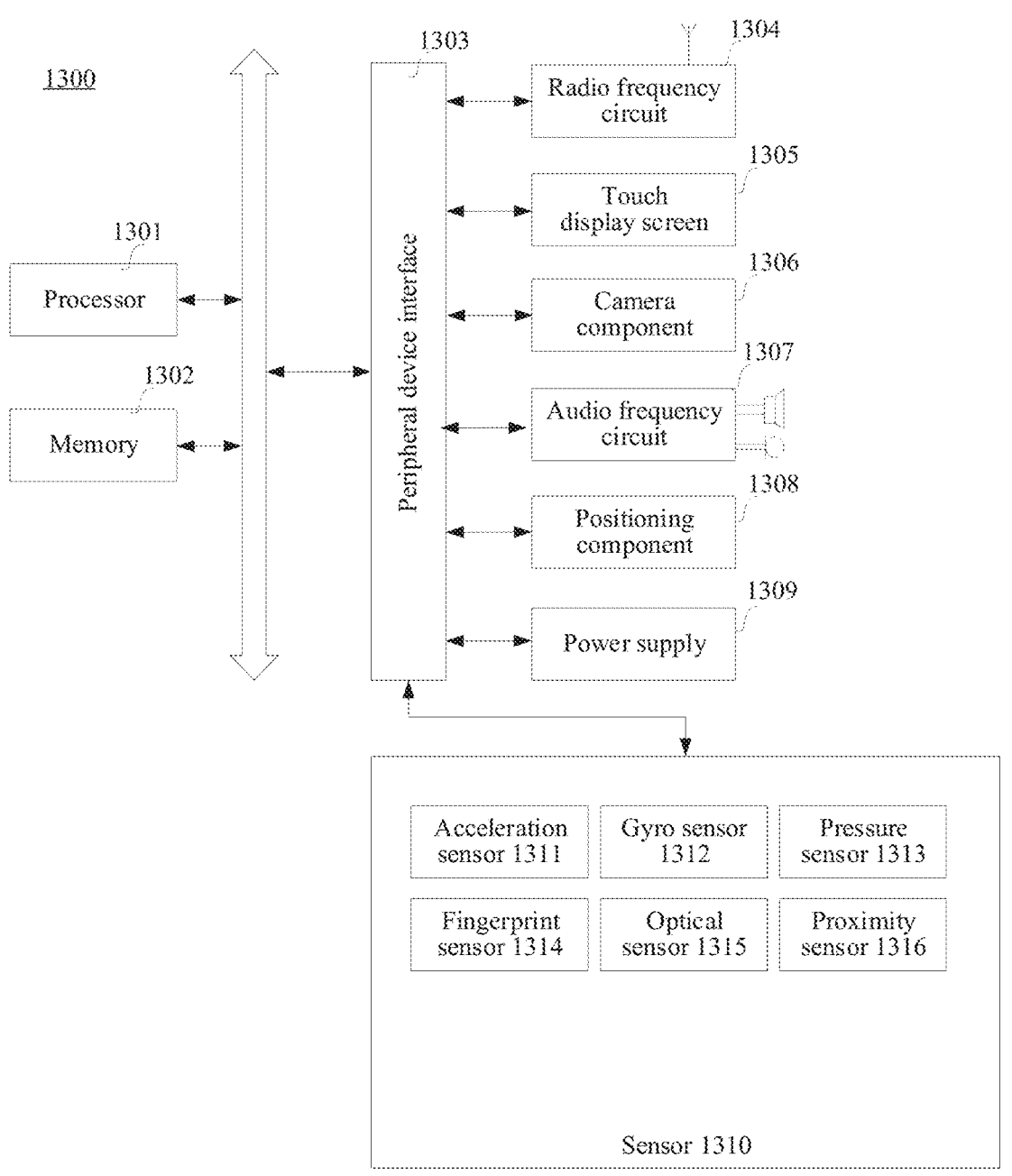
FIG. 13 is a schematic structural diagram of a computer device according to an exemplary embodiment of this application.

FIG. 13 is a structural block diagram of a computer device 1300 according to an exemplary embodiment of this application. The computer device 1300 may be a portable mobile terminal, for example, a smartphone, a tablet computer, a moving picture experts group audio layer III (MP3) player, and a moving picture experts group audio layer IV (MP4) player. The computer device 1300 may also be referred to as user equipment, a portable terminal, and other names.

Generally, the computer device 1300 includes a processor 1301 and a memory 1302.

The processor 1301 may include one or more processing cores. For example, the processor may be a 4-core processor or an 8-core processor. The processor 1301 may be implemented in at least one hardware form of digital signal processing (DSP), a field programmable gate array (FPGA), and a programmable logic array (PLA). The processor 1301 may also include a main processor and a coprocessor. The main processor is a processor configured to process data in an awake state, and is also referred to as a central processing unit (CPU). The coprocessor is a low power consumption processor configured to process data in a standby state. In some embodiments, the processor 1301 may be integrated with a graphics processing unit (GPU). The GPU is configured to be responsible for rendering and drawing content to be displayed by a display screen. In some embodiments, the processor 1301 may further include an artificial intelligence (AI) processor. The AI processor is configured to process a computing operation related to machine learning.

The memory 1302 may include one or more computer-readable storage media. The computer-readable storage medium may be tangible and non-transient. The memory 1302 may further include a high-speed random access memory (RAM), and a non-volatile memory such as one or more magnetic disk storage devices and a flash storage device. In some embodiments, a non-transitory computer-readable storage medium in the memory 1302 is configured to store at least one instruction. The at least one instruction is executed by the processor 1301 to implement the game service execution method based on artificial intelligence provided in the embodiments of this application.

In some embodiments, the computer device 1300 may further include a peripheral interface 1303 and at least one peripheral device. Specifically, the peripheral device includes at least one of a radio frequency (RF) circuit 1304, a touch display screen 1305, a camera component 1306, an audio circuit 1307, a positioning component 1308, and a power supply 1309.

The peripheral device interface 1303 may be configured to connect at least one peripheral related to input/output (I/O) to the processor 1301 and the memory 1302. In some embodiments, the processor 1301, the memory 1302 and the peripheral device interface 1303 are integrated on the same chip or circuit board. In some other embodiments, any one or two of the processor 1301, the memory 1302, and the peripheral device interface 1303 may be implemented on a single chip or circuit board, and are not limited in this embodiment.

The radio frequency circuit 1304 is configured to receive and transmit a radio frequency (RF) signal, which is also referred to as an electromagnetic signal. The RF circuit 1304 communicates with a communication network and another communications device by using the electromagnetic signal. The radio frequency circuit 1304 converts an electrical signal into an electromagnetic signal for transmission, or converts a received electromagnetic signal into an electrical signal. In some embodiments, the radio frequency circuit 1304 includes: an antenna system, an RF transceiver, one or more amplifiers, a tuner, an oscillator, a digital signal processor, a codec chip set, a subscriber identity module card, and the like. The radio frequency circuit 1304 may communicate with another terminal by using at least one wireless communication protocol. The wireless communication protocol includes, but is not limited to, a world wide web, a metropolitan area network, an intranet, generations of mobile communication networks (2G, 3G, 4G, and 5G), a wireless local area network and/or a wireless fidelity (Wi-Fi) network. In some embodiments, the RF 1304 may further include a circuit related to Near-Field Communication (NFC), which is not limited in this application.

The touch display screen 1305 is configured to display a user interface (UI). The UI may include a graph, text, an icon, a video, and any combination thereof. The touch display screen 1305 also has a capability of acquiring a touch signal on or above a surface of the touch display screen 1305. The touch signal may be inputted, as a control signal, to the processor 1301 for processing. The touch display screen 1305 is configured to provide a virtual button and/or a virtual keyboard, which is also referred to as a soft button and/or a soft keyboard. In some embodiments, there is one touch display screen 1305, disposed on a front panel of the computer device 1300. In some other embodiments, there may be at least two touch display screens 1305, respectively disposed on different surfaces of the computer device 1300 or designed in a foldable shape. In still some other embodiments, the touch display screen 1305 may be a flexible display screen, disposed on a curved surface or a folded surface of the computer device 1300. Even, the touch display screen 1305 may be further set in a non-rectangular irregular pattern, namely, a special-shaped screen. The touch display screen 1305 may be made of a material such as a liquid crystal display (LCD) or an organic light-emitting diode (OLED).

The camera assembly 1306 is configured to acquire an image or a video. In some embodiments, the camera assembly 1306 includes a front-facing camera and a rear-facing camera. Generally, the front-facing camera is configured to implement a video call or self-portrait. The rear-facing camera is configured to capturing a picture or a video. In some embodiments, there are at least two rear-facing cameras, each of which is any one of a main camera, a depth of field camera and a wide-angle camera, to implement a background blurring function by fusing the main camera and the depth of field camera, and panoramic shooting and virtual reality VR shooting functions by fusing the main camera and the wide-angle camera. In some embodiments, the camera component 1306 may further include a flash. The flash may be a single-color-temperature flash, or may be a double-color-temperature flash. The double-color-temperature flash refers to a combination of a warm-light flash and a cold-light flash, and may be used for light compensation under different color temperatures.

The audio frequency circuit 1307 is configured to provide an audio interface between a user and the computer device 1300. The audio circuit 1307 may include a microphone and a loudspeaker. The speaker is configured to acquire sound waves of a user and an environment, and convert the sound waves into electric signals and input the electrical signals into the processor 1301 for processing, or input the electrical signals into the RF circuit 1304 to implement speech communication. For the purpose of stereo sound collection or noise reduction, there may be a plurality of microphones, respectively disposed at different parts of the computer device 1300. The microphone may further be an array microphone or an omni-directional acquisition type microphone. The loudspeaker is configured to convert electric signals from the processor 1301 or the RF circuit 1304 into sound waves. The loudspeaker may be a conventional thin-film loudspeaker or a piezoelectric ceramic loudspeaker. When the speaker is the piezoelectric ceramic speaker, the speaker can not only convert an electrical signal into sound waves audible to a human being, but also convert an electrical signal into sound waves inaudible to the human being for ranging and other purposes. In some embodiments, the audio circuit 1307 may further include an earphone jack.

The positioning component 1308 is configured to determine a current geographic location of the computer device 1300 through positioning, to implement navigation or a location based service (LBS). The positioning component 1308 may be a positioning assembly based on the Global Positioning System (GPS) of the United States, the Beidou Navigation Satellite System (BDS) of China, or the Galileo system of Russia.

The power supply 1309 is configured to supply power to components in the computer device 1300. The power supply 1309 may be an alternating current, a direct current, a primary battery, or a rechargeable battery. When the power supply 1309 includes a rechargeable battery, the rechargeable battery may be a wired rechargeable battery or a wireless rechargeable battery. The wired charging battery is a battery charged through a wired line, and the wireless charging battery is a battery charged through a wireless coil. The rechargeable battery may be further configured to support a fast charge technology.

In some embodiments, the computer device 1300 further includes one or more sensors 1310. The one or more sensors 1310 include, but are not limited to, an acceleration sensor 1311, a gyroscope sensor 1312, a pressure sensor 1313, a fingerprint sensor 1314, an optical sensor 1315, and a proximity sensor 1316.

The acceleration sensor 1311 may detect accelerations on three coordinate axes of a coordinate system established by the computer device 1300. For example, the acceleration sensor 1311 may be configured to detect components of gravity acceleration on the three coordinate axes. The processor 1301 may control, according to a gravity acceleration signal acquired by the acceleration sensor 1311, the touch display screen 1305 to display the user interface in a frame view or a portrait view. The acceleration sensor 1311 may be further configured to acquire motion data of a game or a user.

The gyroscope sensor 1312 may detect a body direction and a rotation angle of the computer device 1300. The gyroscope sensor 1312 may cooperate with the acceleration sensor 1311 to collect a 3D action by the user on the computer device 1300. The processor 1301 may implement the following functions according to the data acquired by the gyroscope sensor 1312: motion sensing (such as changing the UI according to a tilt operation of the user), image stabilization at shooting, game control, and inertial navigation.

The pressure sensor 1313 may be disposed on a side frame of the computer device 1300 and/or a lower layer of the touch display screen 1305. When being disposed on a side frame of the computer device 1300, the pressure sensor 1313 may detect a signal generated when the user holds the computer device 1300, and perform left or right hand recognition or a quick operation according to the holding signal. When the pressure sensor 1313 is disposed at the lower layer of the touch display screen 1305, an operable control in the UI interface can be controlled according to a pressure operation of the user on the touch display screen 1305. The operable control includes at least one of a button control, a scroll-bar control, an icon control, and a menu control.

The fingerprint sensor 1314 is configured to acquire a user's fingerprint to identify a user's identity according to the acquired fingerprint. When identifying that the identity of the user is a trusted identity, the processor 1301 authorizes the user to perform related sensitive operations. The sensitive operations include: unlocking a screen, viewing encrypted information, downloading software, paying, changing a setting, and the like. The fingerprint sensor 1314 may be disposed on a front face, a back face, or a side face of the computer device 1300. When a physical button or a vendor logo is disposed on the computer device 1300, the fingerprint sensor 1314 may be integrated together with the physical button or the vendor logo.

The optical sensor 1315 is configured to acquire ambient light intensity. In an embodiment, the processor 1301 may control display brightness of the touch display screen 1305 according to the ambient light intensity acquired by the optical sensor 1315. Specifically, when the ambient light intensity is relatively high, the display brightness of the touch display screen 1305 is increased. When the ambient light intensity is relatively low, the display brightness of the touch display screen 1305 is reduced. In another embodiment, the processor 1301 may further dynamically adjust a camera parameter of the camera assembly 1306 according to the ambient light intensity acquired by the optical sensor 1315.

The proximity sensor 1316, also referred to as a distance sensor, is usually disposed on the front surface of the computer device 1300. The proximity sensor 1316 is configured to collect a distance between a front face of the user and the front surface of the computer device 1300. In an embodiment, when the proximity sensor 1316 detects that the distance between the front face of the user and the front face of the computer device 1300 is gradually decreased, the processor 1301 controls the touch display screen 1305 to switch from a screen-on state to a screen-off state. When the proximity sensor 1316 detects that the distance between the front face of the user and the front face of the computer device 1300 is gradually increased, the processor 1301 controls the touch display screen 1305 to switch from the screen-off state to the screen-on state.

A person skilled in the art may understand that the structure shown in FIG. 13 does not constitute any limitation on the computer device 1300, and the computer device may include more components or fewer components than those shown in the figure, or some components may be combined, or a different component deployment may be used.

This application further provides a computer program product. The computer program product includes computer instructions, the computer instructions are stored in a computer-readable storage medium. A processor of a computer device reads the computer instructions from the computer-readable storage medium, and the processor executes the computer instructions, so that the computer device executes the game service execution method based on artificial intelligence provided in the foregoing method embodiments.

It is to be understood that "plurality of" mentioned in this specification means two or more. "And/or" describes an association relationship for associated objects and represents that three relationships may exist. For example, A and/or B may represent the following three cases: only A exists, both A and B exist, and only B exists. The character "I" in this specification generally indicates an "or" relationship between the associated objects.

A person of ordinary skill in the art may understand that all or some of the steps of the foregoing embodiments may be implemented by using hardware, or may be implemented by a program instructing relevant hardware. The program may be stored in a computer-readable storage medium. The storage medium may be a ROM, a magnetic disk, an optical disc, or the like.

The foregoing descriptions are merely embodiments of this application, but are not intended to limit this application. Any modification, equivalent replacement, or improvement made within the spirit and principle of this application shall fall within the protection scope of this application.

What is claimed is:

1. A game service execution method performed at a computer device acting as an artificial intelligence (AI) participant of a game service in which n participants perform a game according to a game rule, n>2 and n being an integer, the n participants comprising the AI participant, and the method comprising:

constructing, in an ith round of game in the game service comprising a static game, a Monte-Carlo tree corresponding to the ith round of game, the Monte-Carlo tree comprising:

an initial node, at least two participant nodes, at least two logic distribution nodes, and at least two logic gate nodes that correspond to the static game, the logic distribution node being configured to forward, according to an arrangement combination, candidate execution actions corresponding to the at least two participant nodes in the static game to different logic gate nodes, each logic gate node being configured to output a target candidate execution action with a highest priority of at least two candidate execution actions in a same arrangement combination to a lower-layer node according to the game rule, and i being a positive integer;

simulating a game result on each path in the Monte-Carlo tree, the game result including a benefit corresponding to the path in the Monte-Carlo tree;

calculating benefits of the game results corresponding to multiple paths in the Monte-Carlo tree to a highest-layer AI participant node of the AI participant in the Monte-Carlo tree, further comprising:

calculating the benefits corresponding to the game results from a leaf node in the Monte-Carlo tree to the at least two logic gate nodes;

calculating the benefits corresponding to the game results from the at least two logic gate nodes to the initial node;

calculating average benefits corresponding to the static game by using the initial node; and calculating the average benefits from the initial node to the highest-layer AI participant node of the AI participant in the Monte-Carlo tree;

selecting an execution action of the highest-layer AI participant node on a path that has the highest benefit, and outputting the execution action as an AI execution action of the AI participant in the $i^{th}$ round of game; and automatically displaying, on a game interface, user interface elements associated with the AI execution action of the AI participant in the $i^{th}$ round of game.

2. The method according to claim 1, wherein the constructing, in an ith round of game that comprises a static game in the game service, a Monte-Carlo tree corresponding to the $i^{th}$ round of game comprises:

constructing each layer of nodes in the Monte-Carlo tree from a root node in the ith round of game in the game service;

performing expansion to the Monte-Carlo tree by using the at least two participant nodes participating in the static game as (j+1) th-layer nodes in the Monte-Carlo tree when a $j^{th}$-layer node comprises an initial node used for triggering the static game, wherein j is an integer greater than 1; and predicting m candidate execution actions corresponding to the at least two participant nodes in the static game, and performing expansion the Monte-Carlo tree by using m logic distribution nodes in a one-to-one correspondence with the m candidate execution actions as $(j+2)^{th}$-layer nodes in the Monte-Carlo tree, where m is a positive integer; and predicting P arrangement combinations corresponding to the m candidate execution actions, and performing expansion the Monte-Carlo tree by using P logic gate nodes in a one- to-one correspondence with the P arrangement combinations as $(j+3)^{th}$-layer nodes in the Monte-Carlo tree, wherein each logic gate node is configured to output a target candidate execution action with a highest priority of at least two candidate execution actions in a same arrangement combination to the lower-layer node, and P is a positive integer.

3. The method according to claim 2, wherein the constructing each layer of nodes in the Monte-Carlo tree from a root node further comprises:

setting, when an execution action corresponding to the participant node at a $(j-1)^{th}$ layer is an execution action used for triggering the static game, an action distribution node corresponding to the execution action at a $j^{th}$ layer as the initial node used for triggering the static game, wherein j is an integer greater than 1;

wherein the action distribution node is configured to forward the execution action corresponding to the participant node to the participant nodes corresponding to the at least two participants participating in the static game.

4. The method according to claim 1, wherein the logic gate nodes are set as (j+3) th-layer nodes in the Monte-Carlo tree; and calculating the benefits corresponding to the game results from the logic gate nodes to the initial node comprises:

calculating the benefit of the game result corresponding to each path from P logic gate nodes to m logic distribution nodes that are of $(j+2)^{th}$-layer nodes and that correspond to the P logic gate nodes, wherein P and m are both positive integers, and j is an integer greater than 1; and calculating the benefit of the game result corresponding to each path from the m logic distribution nodes to at least two participant nodes that are of $(j+1)^{th}$-layer nodes and that correspond to the m logic distribution nodes.

5. The method according to claim 1, wherein the execution action corresponding to the participant node comprises at least two of the following execution actions in response to that the game service comprises a roshambo service: executing a hand outstretching action corresponding to rock, executing a hand outstretching action corresponding to scissors, and executing a hand outstretching action corresponding to paper;

the execution action corresponding to the participant node comprises at least two of the following execution actions in response to that the game service comprises a Mahjong service: taking a tile, discarding a tile, chow, pung, kong, and win; or the execution action corresponding to the participant node comprises the following two execution actions in response to that the game service comprises a sealed-bid auction service: a bidding action and a bidding dropping action.

6. A computer device comprising a processor and a memory, the memory storing at least one computer program for the computer device for to act as an artificial intelligence (AI) participant of a game service in which n participants perform a game according to a game rule, n>2 and n being an integer, the n participants comprising the AI participant, the at least one computer program being loaded and executed by the processor to perform a plurality of operations including:

constructing, in an $i^{th}$ round of game in the game service comprising a static game, a Monte-Carlo tree corresponding to the $i^{th}$ round of game, the Monte-Carlo tree comprising:

an initial node, at least two participant nodes, at least two logic distribution nodes, and at least two logic gate nodes that correspond to the static game, the logic distribution node being configured to forward, according to an arrangement combination, candidate execution actions corresponding to the at least two participant nodes in the static game to different logic gate nodes, each logic gate node being configured to output a target candidate execution action with a highest priority of at least two candidate execution actions in a same arrangement combination to a lower-layer node according to the game rule, and i being a positive integer;

simulating a game result on each path in the Monte-Carlo tree, the game result including a benefit corresponding to the path in the Monte-Carlo tree;

calculating benefits of the game results corresponding to multiple paths in the Monte-Carlo tree to a highest-layer AI participant node of the AI participant in the Monte-Carlo tree, further comprising:

calculating the benefits corresponding to the game results from a leaf node in the Monte-Carlo tree to the at least two logic gate nodes;

calculating the benefits corresponding to the game results from the at least two logic gate nodes to the initial node;

calculating average benefits corresponding to the static game by using the initial node; and calculating the average benefits from the initial node to the highest-layer AI participant node of the AI participant in the Monte-Carlo tree;

selecting an execution action of the highest-layer AI participant node on a path that has the highest benefit, and outputting the execution action as an AI execution action of the AI participant in the $i^{th}$ round of game; and automatically displaying, on a game interface, user interface elements associated with the AI execution action of the AI participant in the $i^{th}$ round of game.

7. The computer device according to claim 6, wherein the constructing, in an $i^{th}$ round of game that comprises a static game in the game service, a Monte-Carlo tree corresponding to the ith round of game comprises:

constructing each layer of nodes in the Monte-Carlo tree from a root node in the $i^{th}$ round of game in the game service;

performing expansion to the Monte-Carlo tree by using the at least two participant nodes participating in the static game as $(j+1)^{th}$-layer nodes in the Monte-Carlo tree when a $j^{th}$-layer node comprises an initial node used for triggering the static game, wherein j is an integer greater than 1; and predicting m candidate execution actions corresponding to the at least two participant nodes in the static game, and performing expansion the Monte-Carlo tree by using m logic distribution nodes in a one-to-one correspondence with the m candidate execution actions as $(j+2)^{th}$-layer nodes in the Monte-Carlo tree, where m is a positive integer; and predicting P arrangement combinations corresponding to the m candidate execution actions, and performing expansion the Monte-Carlo tree by using P logic gate nodes in a one- to-one correspondence with the P arrangement combinations as $(j+3)^{th}$-layer nodes in the Monte-Carlo tree, wherein each logic gate node is configured to output a target candidate execution action with a highest priority of at least two candidate execution actions in a same arrangement combination to the lower-layer node, and P is a positive integer.

8. The computer device according to claim 7, wherein the constructing each layer of nodes in the Monte-Carlo tree from a root node further comprises:

setting, when an execution action corresponding to the participant node at a $(j-1)^{th}$ layer is an execution action used for triggering the static game, an action distribution node corresponding to the execution action at a $j^{th}$ layer as the initial node used for triggering the static game, wherein j is an integer greater than 1;

wherein the action distribution node is configured to forward the execution action corresponding to the participant node to the participant nodes corresponding to the at least two participants participating in the static game.

9. The computer device according to claim 6, wherein the logic gate nodes are set as $(j+3)^{th}$-layer nodes in the Monte-Carlo tree; and calculating the benefits corresponding to the game results from the logic gate nodes to the initial node comprises:

calculating the benefit of the game result corresponding to each path from P logic gate nodes to m logic distribution nodes that are of $(j+2)^{th}$-layer nodes and that correspond to the P logic gate nodes, wherein P and m are both positive integers, and j is an integer greater than 1; and calculating the benefit of the game result corresponding to each path from the m logic distribution nodes to at least two participant nodes that are of $(j+1)^{th}$-layer nodes and that correspond to the m logic distribution nodes.

10. The computer device according to claim 6, wherein the execution action corresponding to the participant node comprises at least two of the following execution actions in response to that the game service comprises a roshambo service: executing a hand outstretching action corresponding to rock, executing a hand outstretching action corresponding to scissors, and executing a hand outstretching action corresponding to paper;

the execution action corresponding to the participant node comprises at least two of the following execution actions in response to that the game service comprises a Mahjong service: taking a tile, discarding a tile, chow, pung, kong, and win; or the execution action corresponding to the participant node comprises the following two execution actions in response to that the game service comprises a sealed-bid auction service: a bidding action and a bidding dropping action.

11. A non-transitory computer-readable storage medium, the computer-readable storage medium storing at least one computer program for a computer device for to act as an artificial intelligence (AI) participant of a game service in which n participants perform a game according to a game rule, n≥2 and n being an integer, the n participants comprising the AI participant, the at least one computer program being loaded and executed by a processor of a computer device to perform a plurality of operations including:

constructing, in an $i^{th}$ round of game in the game service comprising a static game, a Monte-Carlo tree corresponding to the $i^{th}$ round of game, the Monte-Carlo tree comprising:

an initial node, at least two participant nodes, at least two logic distribution nodes, and at least two logic gate nodes that correspond to the static game, the logic distribution node being configured to forward, according to an arrangement combination, candidate execution actions corresponding to the at least two participant nodes in the static game to different logic gate nodes, each logic gate node being configured to output a target candidate execution action with a highest priority of at least two candidate execution actions in a same arrangement combination to a lower-layer node according to the game rule, and i being a positive integer;

simulating a game result on each path in the Monte-Carlo tree, the game result including a benefit corresponding to the path in the Monte-Carlo tree;

calculating benefits of the game results corresponding to multiple paths in the Monte-Carlo tree to a highest-layer AI participant node of the AI participant in the Monte-Carlo tree, further comprising:

calculating the benefits corresponding to the game results from a leaf node in the Monte-Carlo tree to the at least two logic gate nodes;

calculating the benefits corresponding to the game results from the at least two logic gate nodes to the initial node;

calculating average benefits corresponding to the static game by using the initial node;

calculating the average benefits from the initial node to the highest-layer AI participant node of the AI participant in the Monte-Carlo tree; and selecting an execution action of the highest-layer AI participant node on a path that has the highest benefit, and outputting the execution action as an AI execution action of the AI participant in the $i^{th}$ round of game; and automatically displaying, on a game interface, user interface elements associated with the AI execution action of the AI participant in the $i^{th}$ round of game.

12. The non-transitory computer-readable storage medium according to claim 11, wherein the constructing, in an ith round of game that comprises a static game in the game service, a Monte-Carlo tree corresponding to the ith round of game comprises:

constructing each layer of nodes in the Monte-Carlo tree from a root node in the $i^{th}$ round of game in the game service;

performing expansion to the Monte-Carlo tree by using the at least two participant nodes participating in the static game as $(j+1)^{th}$-layer nodes in the Monte-Carlo tree when a $j^{th}$-layer node comprises an initial node used for triggering the static game, wherein j is an integer greater than 1; and predicting m candidate execution actions corresponding to the at least two participant nodes in the static game, and performing expansion the Monte-Carlo tree by using m logic distribution nodes in a one-to-one correspondence with the m candidate execution actions as $(j+2)^{th}$-layer nodes in the Monte-Carlo tree, where m is a positive integer; and predicting P arrangement combinations corresponding to the m candidate execution actions, and performing expansion the Monte-Carlo tree by using P logic gate nodes in a one- to-one correspondence with the P arrangement combinations as $(j+3)^{th}$-layer nodes in the Monte-Carlo tree, wherein each logic gate node is configured to output a target candidate execution action with a highest priority of at least two candidate execution actions in a same arrangement combination to the lower-layer node, and P is a positive integer.

13. The non-transitory computer-readable storage medium according to claim 12, wherein the constructing each layer of nodes in the Monte-Carlo tree from a root node further comprises:

setting, when an execution action corresponding to the participant node at a $(j-1)^{th}$ layer is an execution action used for triggering the static game, an action distribution node corresponding to the execution action at a $j^{th}$ layer as the initial node used for triggering the static game, wherein j is an integer greater than 1;

wherein the action distribution node is configured to forward the execution action corresponding to the participant node to the participant nodes corresponding to the at least two participants participating in the static game.

14. The non-transitory computer-readable storage medium according to claim 11, wherein the logic gate nodes are set as $(j+3)^{th}$-layer nodes in the Monte-Carlo tree; and calculating the benefits corresponding to the game results from the logic gate nodes to the initial node comprises:

calculating the benefit of the game result corresponding to each path from P logic gate nodes to m logic distribution nodes that are of $(j+2)^{th}$-layer nodes and that correspond to the P logic gate nodes, wherein P and m are both positive integers, and j is an integer greater than 1; and calculating the benefit of the game result corresponding to each path from the m logic distribution nodes to at least two participant nodes that are of $(j+1)^{th}$-layer nodes and that correspond to the m logic distribution nodes.

15. The non-transitory computer-readable storage medium according to claim 11, wherein the execution action corresponding to the participant node comprises at least two of the following execution actions in response to that the game service comprises a roshambo service: executing a hand outstretching action corresponding to rock, executing a hand outstretching action corresponding to scissors, and executing a hand outstretching action corresponding to paper;

the execution action corresponding to the participant node comprises at least two of the following execution actions in response to that the game service comprises a Mahjong service: taking a tile, discarding a tile, chow, pung, kong, and win; or the execution action corresponding to the participant node comprises the following two execution actions in response to that the game service comprises a sealed-bid auction service: a bidding action and a bidding dropping action.

* * * * *